US012627639B2

(12) United States Patent
Guo et al.

(10) Patent No.: US 12,627,639 B2
(45) Date of Patent: May 12, 2026

(54) COMMUNICATION PROTECTION METHOD AND APPARATUS

(71) Applicant: HUAWEI TECHNOLOGIES CO., LTD., Shenzhen (CN)

(72) Inventors: Longhua Guo, Shanghai (CN); He Li, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 17/990,963

(22) Filed: Nov. 21, 2022

(65) Prior Publication Data

US 2023/0077391 A1     Mar. 16, 2023

Related U.S. Application Data

(63) Continuation of application No. PCT/CN2021/093704, filed on May 13, 2021.

(30) Foreign Application Priority Data

May 22, 2020    (CN) .......................... 202010441150.1

(51) Int. Cl.
*H04L 9/40*           (2022.01)
(52) U.S. Cl.
CPC ........ *H04L 63/0428* (2013.01); *H04L 63/083* (2013.01)
(58) Field of Classification Search
None
See application file for complete search history.

(56) References Cited

U.S. PATENT DOCUMENTS 7,386,736 B2 *  6/2008  Bade ....................... G06F 21/34
                                                          713/192
9,154,527 B2 *  10/2015  Lee ..................... H04L 65/1016
(Continued)

FOREIGN PATENT DOCUMENTS

CN        104683304 B      1/2019
CN        111147231 A      5/2020
(Continued)

OTHER PUBLICATIONS

3GPP TSG-SA WG3 Meeting #95bis, S3-191892, Editorial corrections of AKMA TR 33.835 v0.4.0, NEC, Sapporo (Japan), Jun. 24-28, 2019; 1 page.
(Continued)

*Primary Examiner* — Noura Zoubair
*Assistant Examiner* — Mahabub S Ahmed
(74) *Attorney, Agent, or Firm* — Rimon PC

(57)              ABSTRACT

Embodiments of this disclosure provide a communication protection method that includes: a terminal device sends an application session establishment request message to a first application function network element (AF), where the application session establishment request message includes an authentication and key management for application (AKMA) key identifier; and the terminal device receives an application session establishment response message from the first AF, where the application session establishment response message includes a security activation indication. The security activation indication indicates whether to activate security protection on communication between the terminal device and a second AF. The security protection includes confidentiality protection and/or integrity protection performed based on a security key, and the security key is generated based on an AKMA key corresponding to the AKMA key identifier.

20 Claims, 12 Drawing Sheets

(56) References Cited

U.S. PATENT DOCUMENTS

| | | | | |
|---|---|---|---|---|
| 9,455,972 | B1* | 9/2016 | Dotan | H04W 12/35 |
| 9,584,518 | B1* | 2/2017 | Robertson | H04L 65/1104 |
| 9,705,736 | B2* | 7/2017 | Wang | H04L 41/34 |
| 10,880,743 | B1* | 12/2020 | Berzin | H04L 41/0806 |
| 11,086,897 | B2* | 8/2021 | Ching | H04L 63/20 |
| 11,463,466 | B2* | 10/2022 | Higgins | H04L 63/0807 |
| 11,659,382 | B2* | 5/2023 | Torvinen | H04W 12/106 |
| | | | | 726/1 |
| 2003/0236985 | A1* | 12/2003 | Ruuth | G06Q 30/06 |
| | | | | 713/153 |
| 2004/0078568 | A1* | 4/2004 | Pham | G06F 21/6218 |
| | | | | 713/165 |
| 2004/0218605 | A1* | 11/2004 | Gustafsson | H04L 47/10 |
| | | | | 370/395.2 |
| 2005/0154875 | A1* | 7/2005 | Chao | G06F 21/445 |
| | | | | 713/156 |
| 2006/0136748 | A1* | 6/2006 | Bade | H04L 9/3273 |
| | | | | 713/193 |
| 2007/0150934 | A1* | 6/2007 | Fiszman | H04L 63/102 |
| | | | | 726/1 |
| 2007/0277032 | A1* | 11/2007 | Relyea | H04L 63/0853 |
| | | | | 713/159 |
| 2008/0263672 | A1* | 10/2008 | Chen | G06F 21/83 |
| | | | | 726/26 |
| 2009/0291637 | A1* | 11/2009 | Alrabady | H04W 12/033 |
| | | | | 455/41.2 |
| 2013/0055384 | A1* | 2/2013 | Shulman | H04L 63/1425 |
| | | | | 726/22 |
| 2013/0091578 | A1* | 4/2013 | Bisht | G06F 21/53 |
| | | | | 726/25 |
| 2014/0198718 | A1* | 7/2014 | Billau | H04W 40/02 |
| | | | | 370/328 |
| 2015/0033306 | A1* | 1/2015 | Dickenson | G06F 21/31 |
| | | | | 726/7 |
| 2015/0156601 | A1* | 6/2015 | Donnellan | H04W 4/50 |
| | | | | 455/41.1 |
| 2016/0036854 | A1* | 2/2016 | Himawan | H04L 63/04 |
| | | | | 726/5 |
| 2016/0330246 | A1* | 11/2016 | Narayanaswamy | H04L 63/168 |
| 2016/0337484 | A1* | 11/2016 | Tola | H04L 12/6418 |
| 2016/0374104 | A1* | 12/2016 | Watfa | H04W 12/04 |
| 2017/0071029 | A1* | 3/2017 | Cui | H04W 76/28 |
| 2017/0289197 | A1* | 10/2017 | Mandyam | H04L 9/32 |
| 2017/0364875 | A1* | 12/2017 | Efroni | G06F 21/31 |
| 2018/0025332 | A1* | 1/2018 | Huang | G06Q 20/10 |
| | | | | 705/71 |
| 2018/0091528 | A1* | 3/2018 | Shahbaz | G06F 21/554 |
| 2018/0343238 | A1* | 11/2018 | Tola | H04L 67/1095 |
| 2018/0359642 | A1* | 12/2018 | Torvinen | H04W 12/041 |
| 2019/0012447 | A1* | 1/2019 | Lesso | G06F 21/32 |
| 2020/0037165 | A1* | 1/2020 | Kunz | H04W 12/106 |
| 2020/0128020 | A1* | 4/2020 | Abduljaber | H04L 63/10 |
| 2020/0287973 | A1* | 9/2020 | Zhang | G10L 15/26 |
| 2020/0322795 | A1* | 10/2020 | Eskelinen | H04W 12/041 |
| 2021/0067956 | A1* | 3/2021 | Vigneswaran | H04W 12/06 |
| 2021/0135885 | A1* | 5/2021 | Hathorn | H04L 63/08 |
| 2021/0160289 | A1* | 5/2021 | Wifvesson | H04W 12/033 |
| 2021/0273923 | A1* | 9/2021 | Zhang | H04W 12/10 |
| 2021/0406381 | A1* | 12/2021 | Heisrath | H04L 63/123 |
| 2022/0132315 | A1* | 4/2022 | Kolekar | H04L 63/205 |
| 2022/0183049 | A1* | 6/2022 | Lee | H04W 72/569 |
| 2022/0225100 | A1* | 7/2022 | Muhanna | H04L 63/08 |
| 2022/0248230 | A1* | 8/2022 | Wifvesson | H04L 63/0428 |
| 2023/0171600 | A1* | 6/2023 | Baskaran | H04W 12/086 |
| | | | | 455/411 |
| 2023/0188992 | A1* | 6/2023 | Schliwa-Bertling | H04L 63/04 |
| | | | | 726/6 |
| 2023/0224700 | A1* | 7/2023 | Torvinen | H04L 63/123 |
| | | | | 370/329 |

FOREIGN PATENT DOCUMENTS

| | | | | |
|---|---|---|---|---|
| WO | WO-2018000867 | A1* | 1/2018 | H04L 63/0428 |
| WO | WO-2019193147 | A1* | 10/2019 | H04W 76/10 |

OTHER PUBLICATIONS

3GPP TSG-SA3 Meeting #98e, S3-200296, pCR to TS 33.535: Update of the AKMA procedures, Ericsson, e-meeting, Mar. 2-6, 2020; 4 total pages.

3GPP TS 22.125 V17.1.0, 3rd Generation Partnership Project; Technical Specification Group Services and System Aspects; Unmanned Aerial System (UAS) support in 3GPP; Stage 1; (Release 17), Dec. 2019; 16 total pages.

3GPP TR 33.835 V1.2.0, "3rd Generation Partnership Project; Technical Specification Group Services and System Aspects; Study on authentication and key management for applications based on 3GPP credential in 5G (Release 16)" S3-194635, Nov. 2019; 80 total pages.

3GPP TS 33.501 V16.2.0, 3rd Generation Partnership Project; Technical Specification Group Services and System Aspects; Security architecture and procedures for 5G system (Release 16), Mar. 2020; 227 total pages.

3rd Generation Partnership Project; Technical Specification Group Services and System Aspects; Authentication and key management for applications; based on 3GPP credential in 5G ( AKMA ) (Release 16); 3GPP TS 33.535 V0.4.0. Apr. 2020); 15 total pages.

3GPP TS 33.535, V0.4.0, S3-200831, "3rd Generation Partnership Project; Technical Specification Group Services and System Aspects; Authentication and key management for applications; based on 3GPP credential in 5G (AKMA)," (Release 16); Apr. 20, 2020; 15 total pages.

CATT: "The details of the AKMA service subscription information confirmation", 3GPP TSG-SA3, Meeting ad-hoc, e- meeting, Apr. 14-17, 2020; S3-200712; 2 total pages.

* cited by examiner

400

405

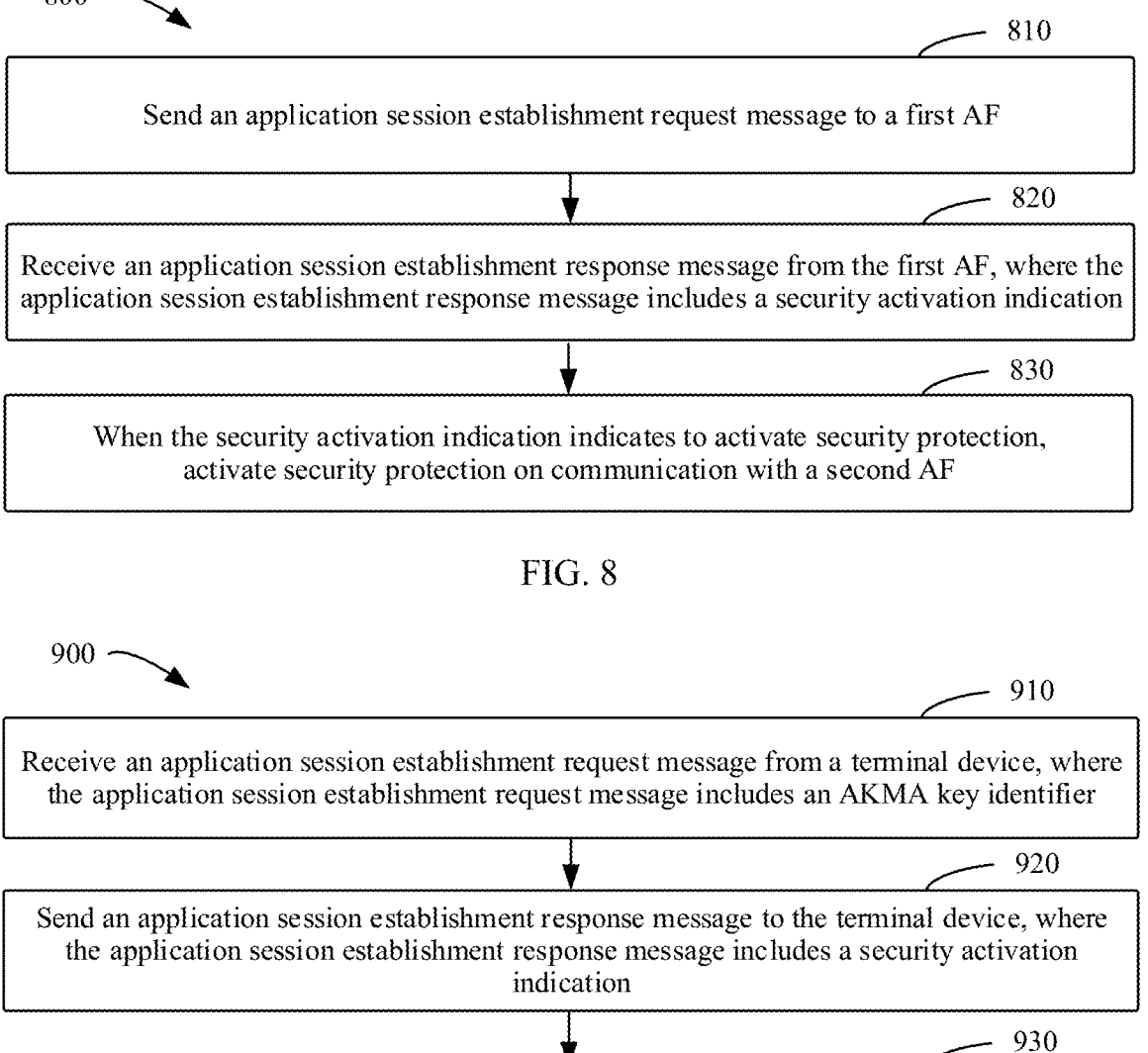

800

810

Send an application session establishment request message to a first AF

820

Receive an application session establishment response message from the first AF, where the application session establishment response message includes a security activation indication

830

When the security activation indication indicates to activate security protection, activate security protection on communication with a second AF

Receive an application session establishment request message from a terminal device, where the application session establishment request message includes an AKMA key identifier

920

Send an application session establishment response message to the terminal device, where the application session establishment response message includes a security activation indication

930

When the security activation indication indicates to activate security protection, activate security protection on communication with the terminal device

FIG. 9

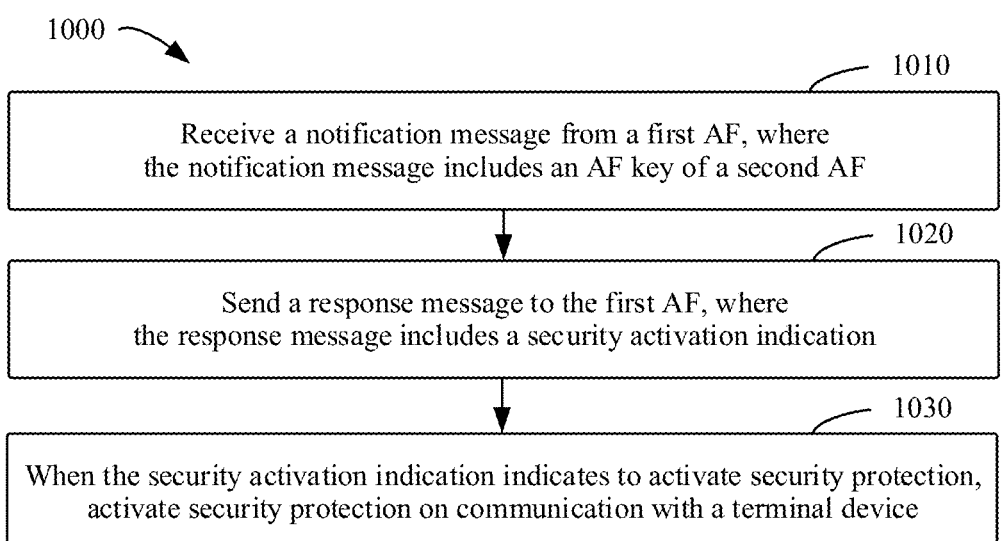

1000

1010

Receive a notification message from a first AF, where
the notification message includes an AF key of a second AF

1020

Send a response message to the first AF, where
the response message includes a security activation indication

1030

When the security activation indication indicates to activate security protection,
activate security protection on communication with a terminal device

FIG. 10

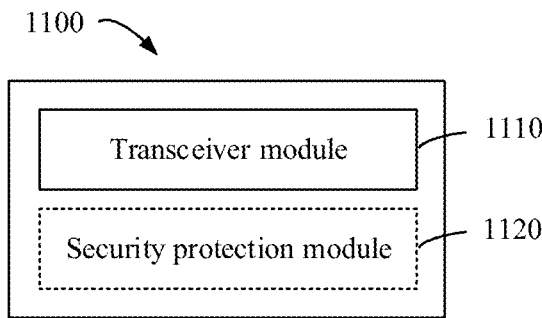

1100

Transceiver module — 1110

Security protection module — 1120

FIG. 11

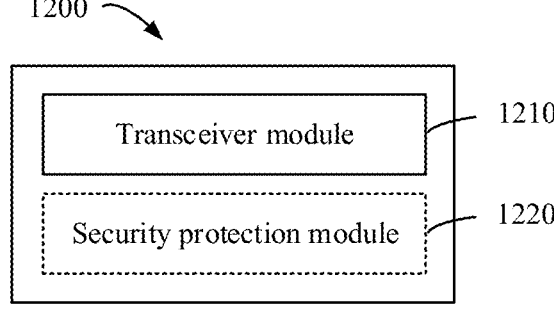

1200

Transceiver module — 1210

Security protection module — 1220

COMMUNICATION PROTECTION METHOD AND APPARATUS

CROSS-REFERENCE TO RELATED APPLICATIONS

This application is a continuation of International Application No. PCT/CN2021/093704, filed on May 13, 2021, which claims priority to Chinese Patent Application No. 202010441150.1, filed on May 22, 2020. The disclosures of the aforementioned applications are hereby incorporated by reference in their entireties.

TECHNICAL FIELD

Embodiments of this disclosure relate generally to the communication field, and more specifically, to a communication protection method and apparatus.

BACKGROUND

The fifth generation (5G) communication system defines an authentication and key management for application (AKMA) architecture. A terminal device (for example, user equipment (UE)) and an application function network element (AF) may perform key negotiation based on an AKMA architecture, to separately generate a key for protecting communication between the terminal device and the AF.

In an existing AKMA architecture, a key at a granularity of an AF identifier (ID) is negotiated between UE and an AF. Consequently, a key at a finer granularity than the AF identifier cannot be negotiated. As a result, end-to-end security protection between the UE and the AF cannot be implemented for different service requirements.

SUMMARY

In general, embodiments of this disclosure provide a communication protection method and apparatus, a device, and a computer-readable medium, so that end-to-end security protection between a terminal device and an AF can be implemented for different service requirements.

According to a first aspect, a communication protection method is provided, and includes: sending, by a terminal device, an application session establishment request message to a first AF, where the application session establishment request message includes an AKMA key identifier; and receiving, by the terminal device, an application session establishment response message from the first AF, where the application session establishment response message includes a security activation indication, the security activation indication indicates whether to activate security protection on communication between the terminal device and a second AF, and the security protection includes confidentiality protection and/or integrity protection; and when the security activation indication indicates to activate the security protection, activating, by the terminal device based on a security key corresponding to the second AF, the security protection on the communication with the second AF, where the security key is generated based on an AKMA key corresponding to the AKMA key identifier. In this way, embodiments of this disclosure can implement end-to-end security protection between the terminal device and an AF for different service requirements.

In some embodiments, the application session establishment request message further includes information about a security algorithm and/or a security policy that are/is supported by the terminal device, where the security algorithm supported by the terminal device includes a confidentiality protection algorithm and/or an integrity protection algorithm that are/is supported by the terminal device, and the security policy supported by the terminal device indicates whether the terminal device supports activation of the security protection on the communication with the second AF. In this way, embodiments of this disclosure can implement security capability negotiation between the terminal device and an AF. The security capability negotiation includes that the terminal device and the AF negotiate whether to activate confidentiality protection and/or integrity protection on communication between the terminal device and the AF, the terminal device and the AF negotiate a confidentiality protection algorithm, an integrity protection algorithm, and/or the like to be jointly used by the terminal device and the AF.

In some embodiments, the application session establishment response message further includes information about a selected security algorithm, where the selected security algorithm includes a confidentiality protection algorithm and/or an integrity protection algorithm supported by both the terminal device and the second AF. The activating, by the terminal device based on a security key corresponding to the second AF, the security protection on the communication with the second AF includes: activating, by the terminal device based on the selected security algorithm and the security key, the security protection on the communication with the second AF. In this way, the terminal device and an AF can negotiate a confidentiality protection algorithm and/or an integrity protection algorithm to be jointly used by the terminal device and the AF.

In some embodiments, the application session establishment response message further includes a key identifier, the key identifier is for identifying a security context between the terminal device and the second AF, and the security context includes the security key. The method further includes: generating, by the terminal device, the security key based on the AKMA key and the selected security algorithm, where the security key is identified by the key identifier. In this way, the terminal device can determine a security context between the terminal device and an AF, and generate a security key in the security context based on a security algorithm negotiated with the AF.

In some embodiments, the first AF is the same as the second AF, and the generating the security key includes: generating, by the terminal device, an AF key of the first AF based on the AKMA key; and generating, by the terminal device, the security key based on the AF key and the selected security algorithm, where the security key includes a confidentiality protection key for the confidentiality protection and/or an integrity protection key for the integrity protection. In this way, the terminal device can generate, based on a security algorithm negotiated with an AF, a security key for protecting communication between the terminal device and the AF.

In some embodiments, the first AF is different from the second AF, and the generating the security key includes: generating, by the terminal device, a first AF key of the first AF based on the AKMA key; generating, by the terminal device, a second AF key of the second AF based on the first AF key and a key generation parameter that is shared by the terminal device and the first AF; and generating, by the terminal device, the security key based on the second AF key and the selected security algorithm, where the security key includes a confidentiality protection key for the confidentiality protection and/or an integrity protection key for the integrity protection. In this way, the terminal device can generate, based on a security algorithm negotiated with an AF, a security key for protecting communication between the terminal device and the AF.

In some embodiments, the key generation parameter includes at least one selected from the following: identity information used by the terminal device in the first AF or the second AF; a service type requested by the terminal device; identification information of the second AF; or a key freshness parameter. The identity information helps implementing security isolation between different usernames. The service type helps implementing data security isolation between different service types. The identification information of the second AF can be used as a basis for the first AF to distinguish between different AFs with a same AF ID, and helps implementing security isolation between different AFs with a same AF ID. The key freshness parameter helps implementing a customized key update periodicity.

In some embodiments, the application session establishment request message includes the key generation parameter. In this way, the key generation parameter can be generated by the terminal device and shared with an AF.

In some embodiments, the application session establishment response message includes the key generation parameter. In this way, the key generation parameter can be generated by an AF and shared with the terminal device.

In some embodiments, the application session establishment response message includes a first integrity verification parameter, and the method further includes: calculating, by the terminal device, a second integrity verification parameter for the application session establishment response message based on the integrity protection algorithm supported by both the terminal device and the second AF and an integrity protection key corresponding to the second AF; and if the first integrity verification parameter matches the second integrity verification parameter, determining, by the terminal device, that the application session establishment response message is not tampered with; or if the first integrity verification parameter does not match the second integrity verification parameter, determining, by the terminal device, that the application session establishment response message is tampered with. In this way, the terminal device can perform integrity verification on a message sent by an AF.

In some embodiments, the method further includes: sending, by the terminal device, an application session establishment complete message to the second AF if it is determined that the application session establishment response message is not tampered with, where the application session establishment complete message includes a third integrity verification parameter, and the third integrity verification parameter is calculated based on the integrity protection algorithm supported by both the terminal device and the second AF and the integrity protection key corresponding to the second AF. In this way, an AF can perform integrity verification on a message sent by the terminal device.

In some embodiments, the security activation indication includes a confidentiality protection indication and/or an integrity protection indication. When the confidentiality protection indication is set to a first preset value, it indicates that the confidentiality protection on the communication between the terminal device and the second AF is not activated. When the confidentiality protection indication is set to a second preset value different from the first preset value, it indicates that the confidentiality protection on the communication between the terminal device and the second AF is activated, and a confidentiality protection algorithm indicated by the second preset value is used for the confidentiality protection. When the integrity protection indication is set to the first preset value, it indicates that the integrity protection on the communication between the terminal device and the second AF is not activated. When the integrity protection indication is set to a third preset value different from the first preset value, it indicates that the integrity protection on the communication between the terminal device and the second AF is activated, and an integrity protection algorithm indicated by the third preset value is used for the integrity protection. In this way, the security activation indication can implicitly indicate a security algorithm to be used between the terminal device and an AF.

In some embodiments, the security activation indication is indicated by the selected security algorithm, where when the selected confidentiality protection algorithm is null, it indicates that confidentiality protection on the communication between the terminal device and the second AF is not activated; when the selected confidentiality protection algorithm is non-null, it indicates that the confidentiality protection on the communication between the terminal device and the second AF is activated; when the selected integrity protection algorithm is null, it indicates that the integrity protection on the communication between the terminal device and the second AF is not activated; and when the selected integrity protection algorithm is non-null, it indicates that the integrity protection on the communication between the terminal device and the second AF is activated.

In some embodiments, the first AF and the second AF have a same AF identifier. In this way, for a scenario in which a plurality of AFs share a same AF ID, this solution can separately generate corresponding keys to implement security isolation in the scenario. An AF can perform key negotiation with the terminal device on behalf of other AFs. Therefore, it is not required that there be an interface between each AF and a public land mobile network (PLMN).

According to a second aspect, a communication protection method is provided, and includes: receiving, by a first AF, an application session establishment request message from a terminal device, where the application session establishment request message includes an AKMA key identifier; sending, by the first AF, an application session establishment response message to the terminal device, where the application session establishment response message includes a security activation indication, the security activation indication indicates whether to activate security protection on communication between the terminal device and a second AF, and the security protection includes confidentiality protection and/or integrity protection; and when the security activation indication indicates to activate the security protection, triggering, by the first AF, the second AF to activate, based on a security key corresponding to the second AF, the security protection on the communication with the terminal device, where the security key is generated based on an AKMA key corresponding to the AKMA key identifier. In this way, embodiments of this disclosure can implement end-to-end security protection between the terminal device and an AF for different service requirements.

In some embodiments, the application session establishment request message further includes information about a security algorithm and/or a security policy that are/is supported by the terminal device, where the security algorithm supported by the terminal device includes a confidentiality protection algorithm and/or an integrity protection algorithm that are/is supported by the terminal device, and the security policy supported by the terminal device indicates whether the terminal device supports activation of the security protection on the communication with the second AF. In this way, embodiments of this disclosure can implement security capability negotiation between the terminal device and an AF. The security capability negotiation includes whether to activate confidentiality protection and/or integrity protection on communication between the terminal device and the AF, and a confidentiality protection algorithm, an integrity protection algorithm, or the like to be jointly used by the terminal device and the AF.

In some embodiments, the application session establishment response message further includes information about a selected security algorithm, where the selected security algorithm includes a confidentiality protection algorithm and/or an integrity protection algorithm supported by both the terminal device and the second AF. The triggering, by the first AF, the second AF to activate, based on a security key corresponding to the second AF, the security protection on the communication with the terminal device includes: triggering, by the first AF, the second AF to activate, based on the selected security algorithm and the security key, the security protection on the communication with the terminal device. In this way, embodiments of this disclosure can activate, based on a security negotiation result between the terminal device and an AF, security protection on communication between the terminal device and the AF. The security negotiation result includes a security algorithm and a security key that are negotiated between the terminal device and the AF.

In some embodiments, the first AF is different from the second AF, and the method further includes: generating, by the first AF, a first AF key of the first AF based on the AKMA key; and generating, by the first AF, a second AF key of the second AF based on the first AF key and a key generation parameter that is shared by the terminal device and the first AF. In this way, the first AF can help the second AF generate the AF key of the second AF.

In some embodiments, the method further includes: sending, by the first AF, a key notification message to the second AF, where the key notification message includes the information about the security algorithm and/or the security policy that are/is supported by the terminal device and the second AF key; and receiving, by the first AF, an acknowledgment message from the second AF, where the acknowledgment message includes the information about the selected security algorithm, the security activation indication, and a key identifier, the key identifier is for identifying a security context between the terminal device and the second AF, and the security context includes the security key. In this way, the second AF can negotiate a security capability with the terminal device by itself based on security capability information of the terminal device that is forwarded by the first AF.

In some embodiments, the sending, by the first AF, an application session establishment response message to the terminal device includes: forwarding, by the first AF, the acknowledgment message to the terminal device as a part of the application session establishment response message. In this way, the terminal device can obtain a security negotiation result between the terminal device and the second AF via the first AF.

In some embodiments, the method further includes: receiving, by the first AF, an application session establishment complete message from the terminal device; and forwarding, by the first AF, the application session establishment complete message to the second AF. In this way, the terminal device can implement message integrity verification between the terminal device and the second AF via the first AF.

In some embodiments, the application session establishment request message further includes the information about the security policy supported by the terminal device, where the security policy supported by the terminal device indicates whether the terminal device supports activation of the security protection on the communication with the second AF; and the method further includes: generating, by the first AF, the security activation indication according to the security policy supported by the terminal device and a security policy supported by the second AF, where the security policy supported by the second AF indicates whether the second AF supports activation of the security protection on the communication with the terminal device. In this way, the security activation indication can be generated based on a security policy negotiation result.

In some embodiments, the method further includes: determining, by the first AF, the selected security algorithm based on the security algorithm supported by the terminal device and a security algorithm supported by the second AF. In this way, an AF can negotiate with the terminal device about a confidentiality protection algorithm and/or an integrity protection algorithm to be jointly used by the AF and the terminal device.

In some embodiments, the method further includes: generating, by the first AF, the security activation indication based on the selected security algorithm, where if the selected security algorithm includes the confidentiality protection algorithm supported by both the terminal device and the second AF, the generated security activation indication indicates to activate the confidentiality protection on the communication between the terminal device and the second AF; and if the selected security algorithm includes the integrity protection algorithm supported by both the terminal device and the second AF, the generated security activation indication indicates to activate the integrity protection on the communication between the terminal device and the second AF. In this way, the security activation indication can be generated based on a security algorithm negotiation result.

In some embodiments, the first AF is the same as the second AF, and the method further includes: generating, by the first AF, an AF key of the first AF based on the AKMA key; and generating, by the first AF, the security key and the key identifier of the security key based on the AF key and the selected security algorithm, where the security key includes a confidentiality protection key for the confidentiality protection and/or an integrity protection key for the integrity protection. In this way, the first AF can generate, based on a security algorithm negotiated with the terminal device, the security key for protecting communication between the first AF and the terminal device.

In some embodiments, the first AF is different from the second AF, and the method further includes: generating, by the first AF, a first AF key of the first AF based on the AKMA key; generating, by the first AF, a second AF key of the second AF based on the first AF key and a key generation parameter that is shared by the terminal device and the first AF; and generating, by the first AF, the security key and the key identifier of the security key based on the second AF key and the selected security algorithm, where the security key includes a confidentiality protection key for the confidentiality protection and/or an integrity protection key for the integrity protection. In this way, the first AF can replace the second AF to generate the security key for protecting the communication between the terminal device and the second AF.

In some embodiments, the application session establishment request message includes the key generation parameter. In this way, the key generation parameter can be generated by the terminal device and shared with an AF.

In some embodiments, the application session establishment response message includes the key generation parameter. In this way, the key generation parameter can be generated by an AF and shared with the terminal device.

In some embodiments, the key generation parameter includes at least one of the following: identity information used by the terminal device in the first AF or the second AF; a service type requested by the terminal device; identification information of the second AF; or a key freshness parameter. The identity information helps implementing security isolation between different usernames. The service type helps implementing data security isolation between different service types. The identification information of the second AF can be used as a basis for the first AF to distinguish between different AFs with a same AF ID, and helps implementing security isolation between different AFs with a same AF ID. The key freshness parameter helps implementing a customized key update periodicity.

In some embodiments, the application session establishment response message includes the key identifier, and the key identifier is for identifying a security context between the terminal device and the second AF. In this way, the terminal device can determine the security context between the terminal device and the second AF, and determine the security key in the security context.

In some embodiments, the application session establishment response message includes a first integrity verification parameter, and the first integrity verification parameter is calculated based on an integrity protection algorithm supported by both the terminal device and the first AF and an integrity protection key corresponding to the first AF. In this way, the terminal device can perform integrity verification on a message sent by the first AF.

In some embodiments, the method further includes: receiving, by the first AF, the application session establishment complete message from the terminal device, where the application session establishment complete message includes a second integrity verification parameter, and the second integrity verification parameter is calculated based on the integrity protection algorithm supported by both the terminal device and the first AF and the integrity protection key corresponding to the first AF; calculating, by the first AF, a third integrity verification parameter for the application session establishment response message based on the integrity protection algorithm supported by both the terminal device and the first AF and the integrity protection key corresponding to the first AF; and if the second integrity verification parameter matches the third integrity verification parameter, determining, by the first AF, that the application session establishment complete message is not tampered with; and if the second integrity verification parameter does not match the third integrity verification parameter, determining, by the first AF, that the application session establishment complete message is tampered with. In this way, the first AF can perform integrity verification on a message sent by the terminal device.

In some embodiments, the triggering, by the first AF, the second AF to activate, based on a security key corresponding to the second AF, the security protection on the communication with the terminal device includes: sending, by the first AF, an activation message to the second AF when determining that the application session establishment complete message is not tampered with, to indicate to the second AF to activate, based on the security key, the security protection on the communication with the terminal device. In this way, the first AF can activate the security protection on the communication between the terminal device and the second AF.

In some embodiments, the security activation indication includes a confidentiality protection indication and/or an integrity protection indication. When the confidentiality protection indication is set to a first preset value, it indicates that the confidentiality protection on the communication between the terminal device and the second AF is not activated. When the confidentiality protection indication is set to a second preset value different from the first preset value, it indicates that the confidentiality protection on the communication between the terminal device and the second AF is activated, and a confidentiality protection algorithm indicated by the second preset value is used for the confidentiality protection. When the integrity protection indication is set to the first preset value, it indicates that the integrity protection on the communication between the terminal device and the second AF is not activated. When the integrity protection indication is set to a third preset value different from the first preset value, it indicates that the integrity protection on the communication between the terminal device and the second AF is activated, and an integrity protection algorithm indicated by the third preset value is used for the integrity protection. In this way, the security activation indication can implicitly indicate a security algorithm to be used between the terminal device and an AF.

In some embodiments, the first AF and the second AF have a same AF identifier. In this way, for a scenario in which a plurality of AFs share a same AF ID, this solution can separately generate corresponding keys to implement security isolation in the scenario. An AF can perform key negotiation with the terminal device on behalf of other AFs. Therefore, it is not required that there be an interface between each AF and a PLMN.

According to a third aspect, a communication protection method is provided, and includes: receiving, by a second AF, a key notification message from a first AF, where the key notification message includes an AF key of the second AF, the AF key is generated based on an AKMA key corresponding to an AKMA key identifier, and the AKMA key identifier is sent by a terminal device to the first AF; sending, by the second AF, an acknowledgment message to the first AF, where the acknowledgment message includes a security activation indication, the security activation indication indicates whether to activate security protection on communication between the terminal device and the second AF, and the security protection includes confidentiality protection and/or integrity protection; and when the security activation indication indicates to activate the security protection, activating, by the second AF based on a security key corresponding to the second AF, the security protection on the communication with the terminal device, where the security key is generated based on the AF key. In this way, embodiments of this disclosure can implement end-to-end security protection between the terminal device and an AF for different service requirements.

In some embodiments, the key notification message further includes information about a security algorithm supported by the terminal device, the security algorithm includes a confidentiality protection algorithm and/or an integrity protection algorithm supported by the terminal device, and the method further includes: determining, by the second AF, a selected security algorithm based on the security algorithm supported by the terminal device and a security algorithm supported by the second AF, where the selected security algorithm includes a confidentiality protection algorithm and/or an integrity protection algorithm supported by both the terminal device and the second AF. In this way, the second AF can negotiate a security capability with the terminal device by itself based on the security capability information of the terminal device that is forwarded by the first AF.

In some embodiments, the acknowledgment message further includes information about the selected security algorithm, and the activating, by the second AF based on a security key corresponding to the second AF, the security protection on the communication with the terminal device includes: activating, by the second AF based on the selected security algorithm and the security key, the security protection on the communication with the terminal device. In this way, embodiments of this disclosure can activate, based on a security negotiation result between the terminal device and an AF, security protection on communication between the terminal device and the AF. The security negotiation result includes a security algorithm and a security key that are negotiated between the terminal device and the AF.

In some embodiments, the method further includes: generating, by the second AF, the security activation indication based on the selected security algorithm, where if the selected security algorithm includes the confidentiality protection algorithm supported by both the terminal device and the second AF, the security activation indication indicates to activate the confidentiality protection on the communication between the terminal device and the second AF; and if the selected security algorithm includes the integrity protection algorithm supported by both the terminal device and the second AF, the security activation indication indicates to activate the integrity protection on the communication between the terminal device and the second AF. In this way, the security activation indication can be generated based on a security algorithm negotiation result.

In some embodiments, the key notification message further includes the information about the security policy supported by the terminal device, where the security policy supported by the terminal device indicates whether the terminal device supports activation of the security protection on the communication with the second AF; and the method further includes: generating, by the second AF, the security activation indication according to the security policy supported by the terminal device and a security policy supported by the second AF, where the security policy supported by the second AF indicates whether the second AF supports activation of the security protection on the communication with the terminal device. In this way, the security activation indication can be generated based on a security policy negotiation result.

In some embodiments, the method further includes: generating, by the second AF, the security key and the key identifier of the security key based on the AF key and the selected security algorithm, where the security key includes a confidentiality protection key for the confidentiality protection and/or an integrity protection key for the integrity protection. In this way, the second AF can generate, based on a security algorithm negotiated with the terminal device, the security key for protecting communication between the second AF and the terminal device.

In some embodiments, the acknowledgment message further includes the key identifier, and the key identifier is for identifying a security context between the terminal device and the second AF. In this way, the terminal device can determine the security context between the terminal device and the second AF, and determine the security key in the security context.

In some embodiments, the acknowledgment message includes a first integrity verification parameter, and the first integrity verification parameter is calculated based on an integrity protection algorithm supported by both the terminal device and the second AF and an integrity protection key corresponding to the second AF. In this way, the terminal device can perform integrity verification on a message sent by the second AF.

In some embodiments, the method further includes: receiving, by the second AF, an application session establishment complete message from the first AF, where the application session establishment complete message includes a second integrity verification parameter, and the second integrity verification parameter is calculated based on the integrity protection algorithm supported by both the terminal device and the second AF and the integrity protection key corresponding to the second AF; calculating, by the second AF, a second integrity verification parameter for the application session establishment response message based on the integrity protection algorithm supported by both the terminal device and the second AF and the integrity protection key corresponding to the second AF; and if the first integrity verification parameter matches the second integrity verification parameter, determining, by the second AF, that the application session establishment complete message is not tampered with; and if the first integrity verification parameter does not match the second integrity verification parameter, determining, by the second AF, that the application session establishment complete message is tampered with. In this way, the second AF can perform integrity verification on a message sent by the terminal device.

In some embodiments, the activating, by the second AF based on a security key corresponding to the second AF, the security protection on the communication with the terminal device includes: if determining that the session establishment complete message is not tampered with, activating, by the second AF based on the security key, the security protection on the communication with the terminal device. In this way, the second AF can activate the security protection on the communication between the terminal device and the second AF.

In some embodiments, the security activation indication includes a confidentiality protection indication and/or an integrity protection indication. When the confidentiality protection indication is set to a first preset value, it indicates that the confidentiality protection on the communication between the terminal device and the second AF is not activated. When the confidentiality protection indication is set to a second preset value different from the first preset value, it indicates that the confidentiality protection on the communication between the terminal device and the second AF is activated, and a confidentiality protection algorithm indicated by the second preset value is used for the confidentiality protection. When the integrity protection indication is set to the first preset value, it indicates that the integrity protection on the communication between the terminal device and the second AF is not activated. When the integrity protection indication is set to a third preset value different from the first preset value, it indicates that the integrity protection on the communication between the terminal device and the second AF is activated, and an integrity protection algorithm indicated by the third preset value is used for the integrity protection. In this way, the security activation indication can implicitly indicate a security algorithm to be used between the terminal device and an AF.

In some embodiments, the first AF and the second AF have a same AF identifier. In this way, for a scenario in which a plurality of AFs share a same AF ID, this solution can separately generate corresponding keys to implement security isolation in the scenario. An AF can perform key negotiation with the terminal device on behalf of other AFs. Therefore, it is not required that there be an interface between each AF and a PLMN.

According to a fourth aspect, a communication apparatus is provided. The communication apparatus may be a terminal device, or may be a chip. The communication apparatus has a function of implementing the terminal device in any one of the foregoing aspects or the possible embodiments of the foregoing aspects. The function may be implemented by hardware, or may be implemented by hardware executing corresponding software. The hardware or the software includes one or more units corresponding to the foregoing function.

In some embodiments, the communication apparatus includes: a transceiver module, configured to: send an application session establishment request message to a first AF, where the application session establishment request message includes an AKMA key identifier; and receive an application session establishment response message from the first AF, where the application session establishment response message includes a security activation indication, the security activation indication indicates whether to activate security protection on communication between the communication apparatus and a second AF, the security protection includes confidentiality protection and/or integrity protection performed based on a security key, and the security key is generated based on an AKMA key corresponding to the AKMA key identifier.

In some embodiments, the application session establishment request message further includes information about a security algorithm supported by the communication apparatus, where the security algorithm supported by the communication apparatus includes a confidentiality protection algorithm supported by the communication apparatus and/or an integrity protection algorithm supported by the communication apparatus; and the application session establishment response message further includes information about a security algorithm selected based on the security algorithm supported by the communication apparatus, where the selected security algorithm includes a selected confidentiality protection algorithm and/or a selected integrity protection algorithm.

In some embodiments, the communication apparatus further includes: a security protection module, configured to: when the security activation indication indicates to activate the security protection, activate, based on the selected security algorithm and the security key, the security protection on the communication with the second AF.

In some embodiments, the first AF and the second AF are a same AF. The communication apparatus further includes: a first key generation module, configured to: generate a first AF key based on the AKMA key; and generate the security key based on the first AF key and the selected security algorithm, where the security key includes a confidentiality protection key for the confidentiality protection and/or an integrity protection key for the integrity protection.

In some embodiments, the first AF and the second AF are different AFs. The communication apparatus further includes: a second key generation module, configured to: generate a first AF key based on the AKMA key; generate a second AF key based on the first AF key and a key generation parameter that is shared by the communication apparatus and the first AF; and generate the security key based on the second AF key and the selected security algorithm, where the security key includes a confidentiality protection key for the confidentiality protection and/or an integrity protection key for the integrity protection.

In some embodiments, the application session establishment request message includes the key generation parameter, and the key generation parameter includes at least one of the following: identity information used by the communication apparatus in the first AF or the second AF; a service type requested by the communication apparatus from the first AF or the second AF; identification information of the second AF; or a key freshness parameter.

In some embodiments, the application session establishment response message includes the key generation parameter, and the key generation parameter includes a key freshness parameter.

In some embodiments, the application session establishment response message further includes a key identifier, the key identifier is for identifying a security context between the terminal device and the second AF, and the security context includes the security key.

In some embodiments, the application session establishment response message includes a first integrity verification parameter. The communication apparatus further includes: an integrity verification module, configured to: determine, based on the security key and the first integrity verification parameter, whether the application session establishment response message is tampered with.

In some embodiments, the transceiver module is further configured to: send an application session establishment complete message to the second AF when the application session establishment response message is not tampered with, where the application session establishment complete message includes a second integrity verification parameter calculated based on the security key.

In some embodiments, the first AF and the second AF have a same AF identifier.

According to a fifth aspect, a communication apparatus is provided. The communication apparatus may be a first AF, or may be a chip. The communication apparatus has a function of implementing the first AF in any one of the foregoing aspects or the possible embodiments of the foregoing aspects. The function may be implemented by hardware, or may be implemented by hardware executing corresponding software. The hardware or the software includes one or more units corresponding to the foregoing function.

In some embodiments, the communication apparatus includes: a transceiver module, configured to: receive an application session establishment request message from a terminal device, where the application session establishment request message includes an AKMA key identifier; and send an application session establishment response message to the terminal device, where the application session establishment response message includes a security activation indication, where the security activation indication indicates whether to activate security protection on communication between the terminal device and a second AF, the security protection includes confidentiality protection and/or integrity protection performed based on a security key, and the security key is generated based on an AKMA key corresponding to the AKMA key identifier.

In some embodiments, the application session establishment request message further includes information about a security algorithm supported by the terminal device, where the security algorithm supported by the terminal device includes a confidentiality protection algorithm and/or an integrity protection algorithm supported by the terminal device; and the application session establishment response message further includes information about a security algorithm selected based on the security algorithm supported by the terminal device, where the selected security algorithm includes a selected confidentiality protection algorithm and/or a selected integrity protection algorithm.

In some embodiments, the communication apparatus further includes: a security protection module, configured to: when the security activation indication indicates to activate the security protection, trigger the second AF to activate, based on the selected security algorithm and the security key, the security protection on the communication with the terminal device.

In some embodiments, the communication apparatus and the second AF are a same AF. The communication apparatus further includes: a first key generation module, configured to: generate a first AF key based on the AKMA key; and generate the security key based on the first AF key and the selected security algorithm, where the security key includes a confidentiality protection key for the confidentiality protection and/or an integrity protection key for the integrity protection.

In some embodiments, the communication apparatus and the second AF are different AFs. The communication apparatus further includes: a second key generation module, configured to: generate a first AF key based on the AKMA key; generate a second AF key based on the first AF key and a key generation parameter that is shared by the terminal device and the communication apparatus; and generate the security key and a key identifier based on the second AF key and the selected security algorithm, where the security key includes a confidentiality protection key for the confidentiality protection and/or an integrity protection key for the integrity protection, the key identifier is for identifying a security context between the terminal device and the second AF, the security context includes the security key, and the application session establishment response message further includes the key identifier. The transceiver module is further configured to send a key notification message to the second AF, where the key notification message includes the information about the selected security algorithm, the security key, and the key identifier.

In some embodiments, the security activation indication is indicated by the selected security algorithm, where when the selected confidentiality protection algorithm is null, it indicates that the confidentiality protection on the communication between the terminal device and the second AF is not activated; when the selected confidentiality protection algorithm is non-null, it indicates that the confidentiality protection on the communication between the terminal device and the second AF is activated; when the selected integrity protection algorithm is null, it indicates that the integrity protection on the communication between the terminal device and the second AF is not activated; and when the selected integrity protection algorithm is non-null, it indicates that the integrity protection on the communication between the terminal device and the second AF is activated.

In some embodiments, the communication apparatus further includes: a security activation indication generation module, configured to: determine whether to activate the security protection on the communication between the terminal device and the second AF; and generate the security activation indication based on a determining result.

In some embodiments, the security activation indication generation module is further configured to: determine, depending on whether the confidentiality protection algorithm supported by the terminal device includes a confidentiality protection algorithm supported by the second AF, whether to activate the confidentiality protection on the communication between the terminal device and the second AF; and/or determine, depending on whether the integrity protection algorithm supported by the terminal device includes an integrity protection algorithm supported by the second AF, whether to activate the integrity protection on the communication between the terminal device and the second AF.

In some embodiments, the application session establishment request message further includes a security policy supported by the terminal device, and the security policy supported by the terminal device indicates whether the terminal device supports activation of the security protection on the communication with the second AF. The security activation indication generation module is further configured to determine, according to the security policy supported by the terminal device and a security policy supported by the second AF, whether to activate the security protection, where the security policy supported by the second AF indicates whether the second AF supports activation of the security protection on the communication with the terminal device.

In some embodiments, the communication apparatus and the second AF are different AFs. The communication apparatus further includes: a third key generation module, configured to: generate a first AF key based on the AKMA key; and generate a second AF key based on the first AF key and a key generation parameter that is shared by the terminal device and the communication apparatus. The transceiver module is further configured to: send a key notification message to the second AF, where the key notification message includes the information about the security algorithm supported by the terminal device and the second AF key; and receive an acknowledgment message from the second AF, where the acknowledgment message includes the information about the selected security algorithm, the security activation indication, and a key identifier, the key identifier is for identifying a security context between the terminal device and the second AF, and the security context includes the security key, where the application session establishment response message further includes the key identifier.

In some embodiments, the transceiver module is further configured to receive an application session establishment complete message from the terminal device, where the application session establishment complete message includes a second integrity verification parameter. The communication apparatus further includes: an integrity verification module, configured to determine, based on the security key and the second integrity verification parameter, whether the application session establishment complete message is tampered with.

In some embodiments, the transceiver module is further configured to send an activation message to the second AF when determining that the application session establishment complete message is not tampered with, where the activation message indicates to the second AF to activate, based on the security key, the security protection on the communication with the terminal device.

According to a sixth aspect, a communication apparatus is provided. The communication apparatus may be a second AF, or may be a chip. The communication apparatus has a function of implementing the second AF in any one of the foregoing aspects or the possible embodiments of the foregoing aspects. The function may be implemented by hardware, or may be implemented by hardware executing corresponding software. The hardware or the software includes one or more units corresponding to the foregoing function.

In some embodiments, the communication apparatus includes: a transceiver module, configured to receive a key notification message from a first AF, where the key notification message includes information about a security algorithm supported by a terminal device and a second AF key; and send an acknowledgment message to the first AF, where the acknowledgment message includes information about a security algorithm selected based on the security algorithm supported by the terminal device, a security activation indication, and a key identifier; and the selected security algorithm includes a selected confidentiality protection algorithm and/or a selected integrity protection algorithm, the security activation indication indicates whether to activate security protection on communication between the terminal device and the communication apparatus, the security protection includes confidentiality protection and/or integrity protection performed based on a security key, the security key is generated based on the second AF key and the selected security algorithm, the key identifier is for identifying a security context between the terminal device and the communication apparatus, and the security context includes the security key.

In some embodiments, the communication apparatus further includes: a security protection module, configured to: when the security activation indication indicates to activate the security protection, activate, based on the selected security algorithm and the security key, the security protection on the communication with the terminal device.

In some embodiments, the communication apparatus further includes: a security activation indication generation module, configured to: determine whether to activate the security protection on the communication between the terminal device and the communication apparatus; and generate the security activation indication based on a determining result.

In some embodiments, the security activation indication generation module is further configured to: determine, depending on whether a confidentiality protection algorithm supported by the terminal device includes a confidentiality protection algorithm supported by the communication apparatus, whether to activate the confidentiality protection on the communication between the terminal device and the communication apparatus; and/or determine, depending on whether an integrity protection algorithm supported by the terminal device includes an integrity protection algorithm supported by the communication apparatus, whether to activate the integrity protection on the communication between the terminal device and the communication apparatus.

In some embodiments, the key notification message further includes a security policy supported by the terminal device, and the security policy supported by the terminal device indicates whether the terminal device supports activation of the security protection on the communication with the communication apparatus. The security activation indication generation module is further configured to determine, according to the security policy supported by the terminal device and a security policy supported by the communication apparatus, whether to activate the security protection, where the security policy supported by the communication apparatus indicates whether the communication apparatus supports activation of the security protection on the communication with the terminal device.

In some embodiments, the communication apparatus further includes: a key generation module, configured to generate the security key and the key identifier based on the second AF key and the selected security algorithm, where the security key includes a confidentiality protection key for the confidentiality protection and/or an integrity protection key for the integrity protection.

In some embodiments, the transceiver module is further configured to receive an application session establishment complete message from the first AF, where the application session establishment complete message includes a second integrity verification parameter. The communication apparatus further includes: an integrity verification module, configured to determine, based on the security key and the second integrity verification parameter, whether the application session establishment complete message is tampered with.

In some embodiments, the security protection module is further configured to: when the security activation indication indicates to activate the security protection and when determining that the application session establishment complete message is not tampered with, activate, based on the selected security algorithm and the security key, the security protection on the communication with the terminal device.

According to a seventh aspect, a communication protection apparatus is provided. The apparatus includes one or more processors and a memory. The memory is configured to store one or more programs. When the one or more programs are executed by the one or more processors, the apparatus is enabled to perform the method of the terminal device in any one of the foregoing aspects or the possible embodiments of the foregoing aspects.

According to an eighth aspect, a communication protection apparatus is provided. The apparatus includes one or more processors and a memory. The memory is configured to store one or more programs. When the one or more programs are executed by the one or more processors, the apparatus is enabled to perform the method of the first AF in any one of the foregoing aspects or the possible embodiments of the foregoing aspects.

According to a ninth aspect, a communication protection apparatus is provided. The apparatus includes one or more processors and a memory. The memory is configured to store one or more programs. When the one or more programs are executed by the one or more processors, the apparatus is enabled to perform the method of the second AF in any one of the foregoing aspects or the possible embodiments of the foregoing aspects.

According to a tenth aspect, a communication system is provided. The communication system includes a first AF and a second AF. The first AF is configured to: receive an application session establishment request message from a terminal device, where the application session establishment request message includes an AKMA key identifier; and send an application session establishment response message to the terminal device, where the application session establishment response message includes a security activation indication, where the security activation indication indicates whether to activate security protection on communication between the terminal device and a second AF, the security protection includes confidentiality protection and/or integrity protection performed based on a security key, and the security key is generated based on an AKMA key corresponding to the AKMA key identifier.

In some embodiments, the application session establishment request message further includes information about a security algorithm supported by the terminal device, where the security algorithm supported by the terminal device includes a confidentiality protection algorithm supported by the terminal device and/or an integrity protection algorithm supported by the terminal device; and the application session establishment response message further includes information about a security algorithm selected based on the security algorithm supported by the terminal device, where the selected security algorithm includes a selected confidentiality protection algorithm and/or a selected integrity protection algorithm. In some embodiments, the first AF is further configured to: when the security activation indication indicates to activate the security protection, trigger the second AF to activate, based on the selected security algorithm and the security key, the security protection on the communication with the terminal device.

According to an eleventh aspect, a communication system is provided. The communication system includes a first AF and a second AF different from the first AF. The first AF is configured to: receive an application session establishment request message from a terminal device, where the application session establishment request message includes an AKMA key identifier and information about a security algorithm supported by the terminal device; generate a first AF key based on an AKMA key corresponding to the AKMA key identifier; generate a second AF key based on the first AF key and a key generation parameter that is shared by the terminal device and the first AF; send a key notification message to the second AF, where the key notification message includes the information about the security algorithm supported by the terminal device and the second AF key; receive an acknowledgment message from the second AF, where the acknowledgment message includes information about a security algorithm selected based on the security algorithm supported by the terminal device, a security activation indication, and a key identifier; and send an application session establishment response message to the terminal device, where the application session establishment response message includes the information about the selected security algorithm, the security activation indication, and the key identifier. The selected security algorithm includes a selected confidentiality protection algorithm and/or a selected integrity protection algorithm. The security activation indication indicates whether to activate security protection on communication between the terminal device and the second AF. The security protection includes confidentiality protection and/or integrity protection performed based on a security key, where the security key is generated based on the second AF key. The key identifier is for identifying a security context between the terminal device and the second AF, and the security context includes the security key. The second AF is configured to: receive the key notification message from the first AF, generate the security key based on the second AF key and the selected security algorithm, and send the acknowledgment message to the first AF. The second AF is further configured to: when the security activation indication indicates to activate the security protection, activate, based on the selected security algorithm and the security key, the security protection on the communication with the terminal device.

According to a twelfth aspect, a computer-readable storage medium is provided. The computer-readable storage medium stores a program. The program enables a terminal device to perform the method of the terminal device in any one of the foregoing aspects or the possible embodiments of the foregoing aspects.

According to a thirteenth aspect, a computer-readable storage medium is provided. The computer-readable storage medium stores a program. The program enables a first AF to perform the method of the first AF in any one of the foregoing aspects or the possible embodiments of the foregoing aspects.

According to a fourteenth aspect, a computer-readable storage medium is provided. The computer-readable storage medium stores a program. The program enables a second AF to perform the method of the second AF in any one of the foregoing aspects or the possible embodiments of the foregoing aspects.

According to a fifteenth aspect, a communication chip is provided, where the communication chip stores instructions. When the instructions are run on the communication chip, the communication chip is enabled to perform the method in any one of the foregoing aspects or the possible embodiments of the foregoing aspects.

According to a fifteenth aspect, a computer program product is provided. When the computer program product runs on a computer, the computer is enabled to perform the method in any one of the foregoing aspects or the possible embodiments of the foregoing aspects.

BRIEF DESCRIPTION OF DRAWINGS

FIG. 8 is a flowchart of an example communication protection method according to an embodiment of this disclosure;

FIG. 9 is a flowchart of an example communication protection method according to an embodiment of this disclosure;

FIG. 10 is a flowchart of an example communication protection method according to an embodiment of this disclosure;

FIG. 11 is a block diagram of an example communication apparatus according to an embodiment of this disclosure;

FIG. 12 is a block diagram of an example communication apparatus according to an embodiment of this disclosure;

In the accompanying drawings, same or corresponding reference numerals represent same or corresponding parts.

DESCRIPTION OF EMBODIMENTS

Figure 1A:
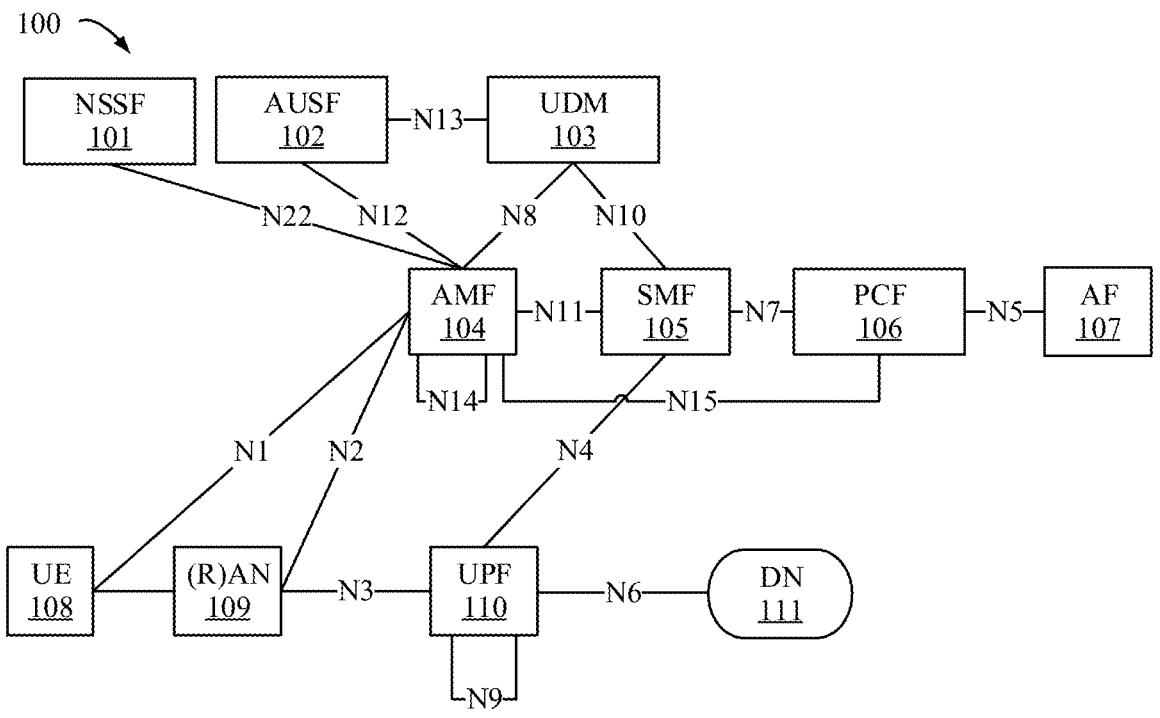
FIG. 1A and FIG. 1B are block diagrams of a 3GPP system architecture in 5G.

Principles of this disclosure will now be described with reference to some example embodiments. It should be understood that these embodiments are described only for purposes of illustration, and help a person skilled in the art understand and implement this disclosure, without implying any limitation on the scope of this disclosure. In addition to the manners described below, disclosed content described in this specification may be implemented in various manners.

In the following description and claims, unless otherwise defined, all technical and scientific terms used in this specification have the same meanings as those commonly understood by those of ordinary skill in the art to which this disclosure belongs.

As used herein, singular forms "a", "one", and "the" are also intended to include plural forms, unless otherwise specified in the context. The term "include" and variants thereof should be interpreted as open terms, meaning "include but not limited to". The term "based" should be interpreted as "at least partially based". The terms "one embodiment" and "an embodiment" should be interpreted as "at least one embodiment". The term "another embodiment" should be understood as "at least one other embodiment". The terms "first", "second", and the like may indicate different or same objects. Other definitions (explicit and implicit) may be included below.

In some examples, a value, a process, or an apparatus is referred to as a "best", "lowest", "highest", "minimum", or "maximum" value, process, or apparatus, or the like. It should be understood that such a description is intended to indicate that selection may be made among many functional alternatives used, and that such a selection does not need to be better, smaller, higher, or otherwise preferred than other choices.

Communication discussed in this disclosure may comply with any suitable standard, including but not limited to new radio (NR), long term evolution (LTE), LTE evolution, LTE-advanced (LTE-A), wideband code division multiple access (WCDMA), code division multiple access (CDMA), and global system for mobile communications (GSM). In addition, communication may be performed according to a currently known communication protocol or a communication protocol in any generation to be developed in the future. Examples of the communication protocol include but are not limited to 1st-generation (1G), 2nd-generation (2G), 2.5G, 2.75G, 3rd-generation (3G), 4th-generation (4G), 4.5G, and 5th-generation (5G) communication protocols.

For the purpose of description, the following describes embodiments of this disclosure in the context of a 5G 3GPP communication system. However, it should be understood that embodiments of this disclosure are not limited to being applied to a 5G 3GPP communication system, but may be applied to any communication system having a similar problem, for example, a wireless local area network (WLAN), a wired communication system, or another communication system developed in the future.

Figure 1B:
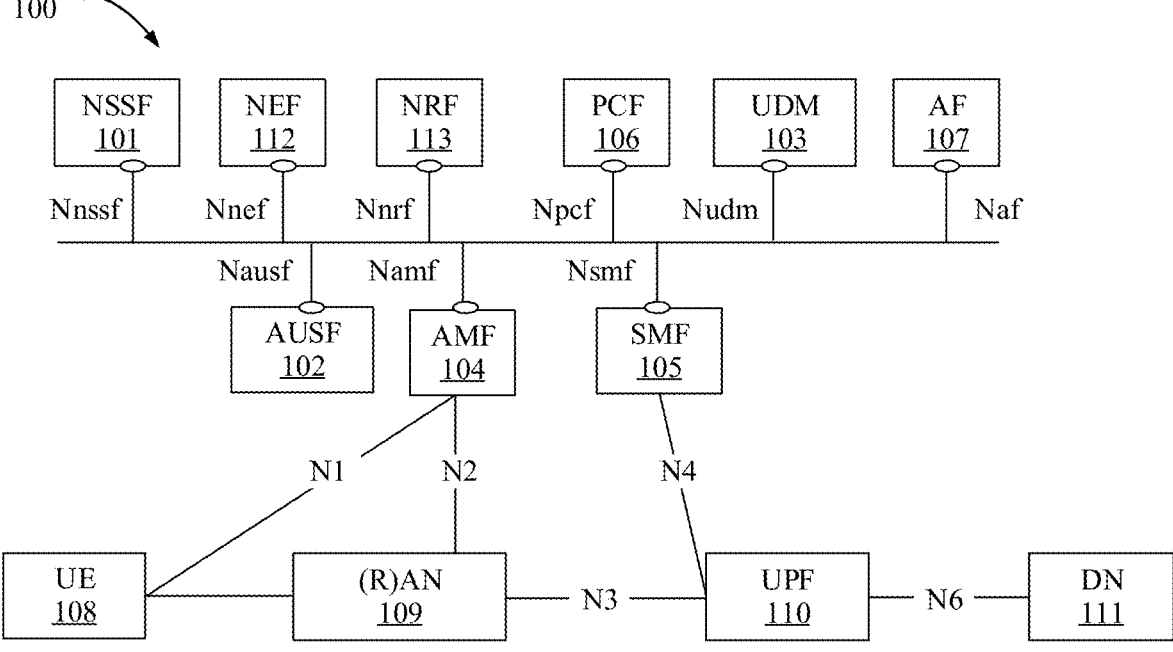

FIG. 1A and FIG. 1B are block diagrams of a 3GPP system architecture 100 in 5G. As shown in FIG. 1A, the system architecture 100 includes the following network functions (also referred to as "network elements") and entities: a network slice selection function (NSSF) 101, an authentication server function (AUSF) 102, a unified data management (UDM) 103, an access and mobility management function (AMF) 104, a session management function (SMF) 105, a policy control function (PCF) 106, an application function (AF) 107, user equipment (UE) 108, a radio access network device (RAN) 109, a user plane function (UPF) 110, and a data network (DN) 111.

The UE 108 is connected to the AMF 104 through an N1 interface. The UE 108 is connected to the RAN 109 by using a radio resource control (RRC) protocol. The RAN 109 is connected to the AMF 104 through an N2 interface, and the RAN 109 is connected to the UPF 110 through an N3 interface. A plurality of UPFs 110 are connected to each other through an N9 interface. The UPF 110 is connected to the DN 111 through an N6 interface, and is further connected to the SMF 105 through an N4 interface. The SMF 105 is connected to the PCF 106 through an N7 interface, the SMF 105 is further connected to the UDM 103 through an N10 interface, and the SMF 105 is connected to the AMF 104 through an N11 interface. A plurality of AMFs 104 are connected to each other through an N14 interface. The AMF 104 is connected to the UDM 103 through an N8 interface, the AMF 104 is further connected to the AUSF 102 through an N12 interface, and the AMF 104 is connected to the PCF 106 through an N15 interface. The AUSF 102 is connected to the UDM 103 through an N13 interface. The AMF 104 and the SMF 105 obtain user subscription data from the UDM 103 through the N8 interface and the N10 interface respectively, and obtain policy data from the PCF 106 through the N15 interface and the N7 interface respectively. The AF 107 is connected to the PCF 106 through an N5 interface. Some interfaces in FIG. 1A may be implemented by service-based interfaces, as shown in FIG. 1B.

In FIG. 1B, Nnssf represents a service-based interface provided by the NSSF 101. Nnef represents a service-based interface provided by a network exposure function network element (NEF) 112. Nnrf represents a service-based interface provided by a network repository function network element (NRF) 113. Npcf represents a service-based interface provided by the PCF 106. Nudm represents a service-based interface provided by the UDM 103. Naf represents a service-based interface provided by the AF 107. Nausf represents a service-based interface provided by the AUSF 102. Namf represents a service-based interface provided by the AMF 104. Nsmf represents a service-based interface provided by the SMF 105.

The following briefly describes some network elements and entities in the 3GPP system architecture in 5G.

The UE 108 represents a terminal device, and the terminal device may be a handheld terminal, a notebook computer, a subscriber unit, a cellular phone, a smartphone, a wireless data card, a personal digital assistant, a tablet computer, a wireless modem, a handheld device, a laptop computer, a cordless telephone set, or a wireless local loop (WLL) station, a machine type communication (MTC) terminal, or another device that can access the network. The terminal device communicates with an access network device by using an air interface technology.

The RAN 109 is responsible for radio resource management, quality of service (QoS) management, data compression and encryption, and other functions on an air interface side. The RAN 109 may include base stations in various forms, including but not limited to a macro base station, a micro base station (also referred to as a small cell), a relay station, an access point, and the like. In systems using different radio access technologies, names of a device having a base station function may vary. For example, in a 3rd generation (3G) system, the device is referred to as a NodeB; in an LTE system, the device is referred to as an evolved NodeB (evolved NodeB, eNB or eNodeB); and in a 5th generation (5G) system, the device is referred to as a gNB.

The AMF 104 is a core network element, and is responsible for signaling processing, including but not limited to functions such as access control, mobility management, attachment and detachment, and gateway selection. When the AMF 104 provides a service for a session in the UE 108, the AMF provides a control plane storage resource for the session, to store a session identifier, an SMF network element identifier associated with the session identifier, and the like.

The SMF 105 is responsible for user plane network element selection, user plane network element redirection, internet protocol (IP) address assignment, bearer establishment, modification, and release, and QoS control.

The UPF 110 is responsible for forwarding and receiving user data in the UE 108. The UPF 110 may receive user data from the DN 111, and transmit the user data to the UE 108 via the RAN 109. The UPF 110 may further receive user data from the UE 108 via the RAN 109, and forward the user data to the DN 111. A transmission resource and a scheduling function that are used by the UPF 110 to provide a service for the UE 108 are managed and controlled by the SMF 105.

The PCF 106 supports providing of a unified policy framework to control network behavior, and providing of a policy rule for a control layer network function, and is responsible for obtaining policy-related subscription information of a subscriber.

The AUSF 102 provides an authentication function, and supports authentication for 3GPP access and non-3GPP access.

The NEF 112 supports secure interaction between a 3GPP network and a third-party application. The NEF 112 can securely expose network capabilities and events to a third party to enhance or improve application service quality. The 3GPP network can also securely obtain related data from the third party, to enhance intelligent network decision-making. In addition the NEF 112 supports restoring structured data from a unified data repository or storing structured data in the unified data repository.

The UDM 103 is responsible for storing structured data. Stored content includes subscription data and policy data, externally exposed structured data, and application-related data.

The AF 107 supports interacting with a 3GPP core network to provide a service, for example, a service that affects a data routing decision or a policy control function, or some third-party services provided for a network side.

An AKMA architecture is defined in the 5G communication system. A terminal device (for example, UE) and an AF may perform key agreement based on the AKMA architecture, to separately generate a key for protecting communication between the UE and the AF.

Figures 2, 3A:
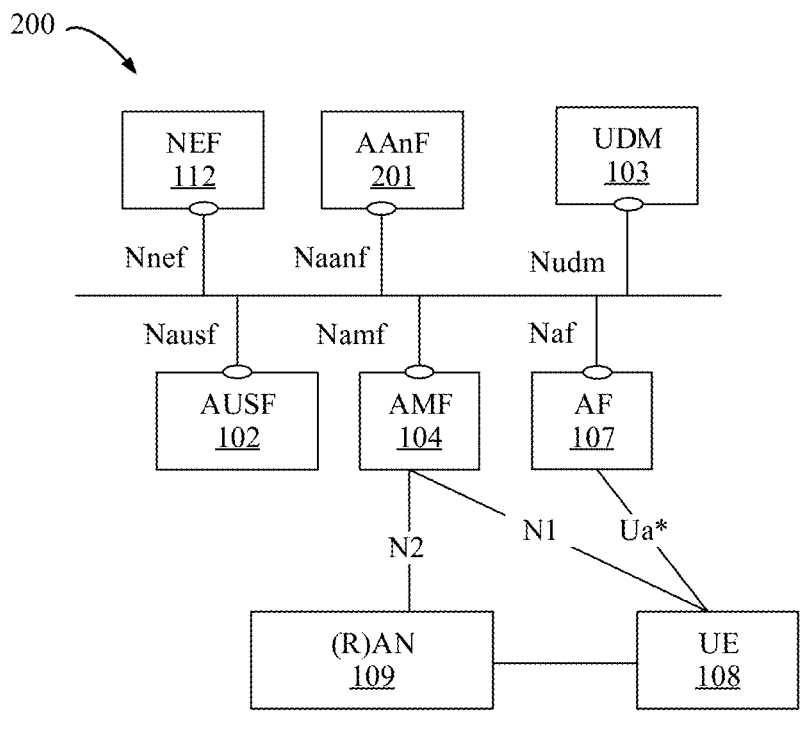
FIG. 2 is a block diagram of an example network model for AKMA in 5G.
FIG. 3A and FIG. 3B are signaling exchange diagrams of an AKMA process in a conventional solution.

FIG. 2 is a block diagram of an example network model 200 for AKMA in 5G. Network elements related to the network model 200 include an AKMA anchor function (AAnF) 201, an AF 107, an NEF 112, an AUSF 102, and the like.

The AAnF 201 enables AKMA root key ($K_{AKMA}$) derivation for an AKMA service, that is, the AAnF 201 interacts with the AUSF 102 to obtain the AKMA root key $K_{AKMA}$, and is responsible for generating, for the AF, a key KAF used by the AF and a validity period of KAF.

The AF 107 interacts with a 3GPP core network element to provide a service. For example, the AF 107 may interact with a PCF to perform policy control (such as QoS control). The AF 107 may interact with the 3GPP core network element to provide information about impact on service routing, and the like. In an AKMA scenario, the AF 107 needs to interact with the AAnF 201 to obtain the key KAF used by the AF and the validity period of KAF. Based on deployment of an operator, the AF 107 may be a network element trusted by the operator, and is allowed to directly interact with a related network function; or may be a network element not trusted by the operator, and needs to interact with a related network function via the NEF 112.

The NEF 112 is for capability and event exposure, internal-external information translation, transmission of a non-IP packet, and the like. In the AKMA scenario, the AF 107 obtains a service of the AAnF 201 via the NEF 112.

The AUSF 102 supports authentication for 3GPP access and non-3GPP access. In the AKMA scenario, the AUSF 102 generates an AKMA root key $K_{AKMA}$, and provides the AKMA root key $K_{AKMA}$ to the AAnF 201.

In FIG. 2, Ua* represents a reference point between UE 108 and the AF 107, and is for message exchange between the UE 108 and the AF 107 to support key generation in an AKMA procedure.

Figure 3B:
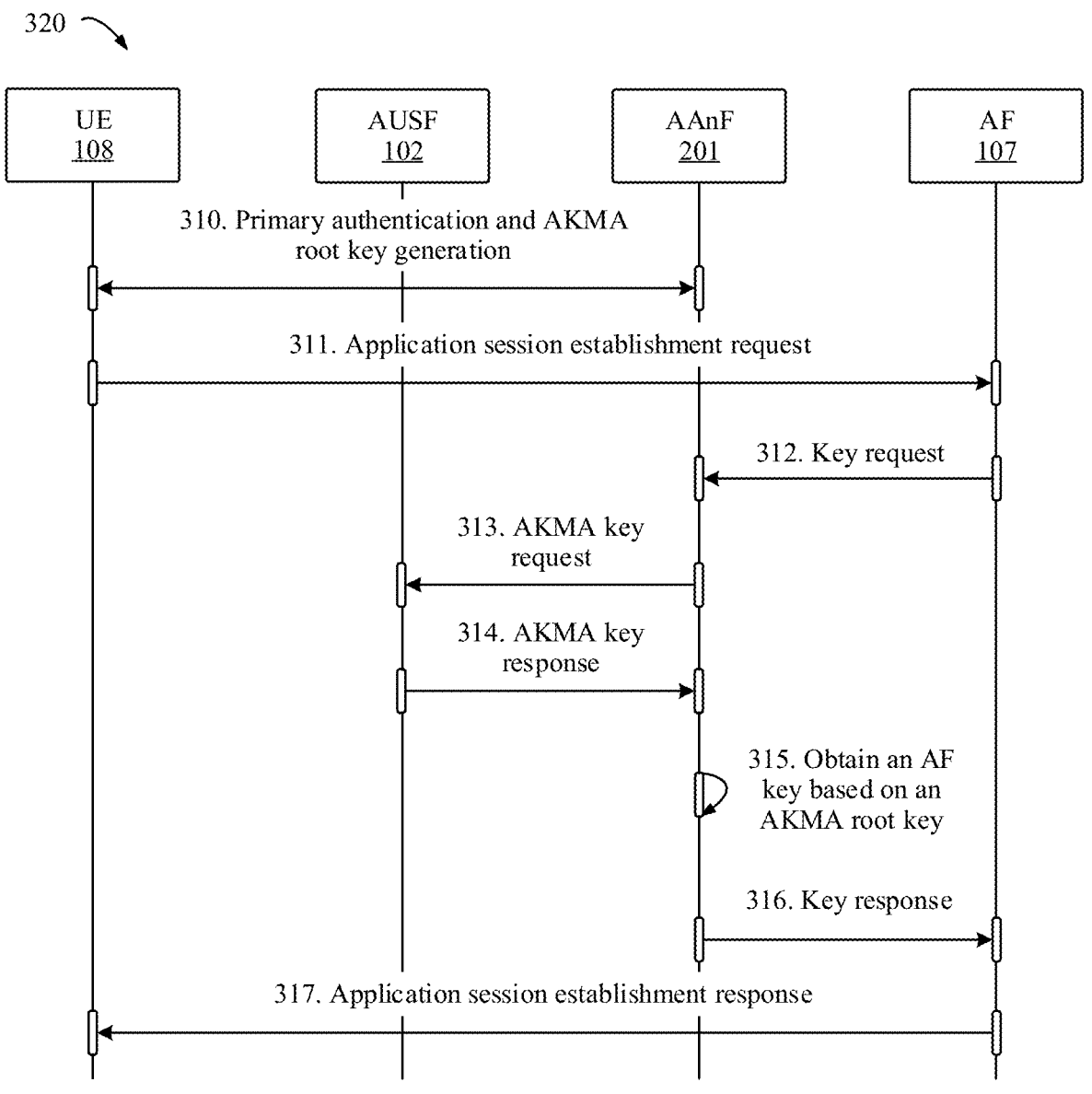

FIG. 3A and FIG. 3B are signaling exchange diagrams of an AKMA process in a conventional solution. FIG. 3A shows a procedure 310 of generating an AKMA root key $K_{AKMA}$ in a UE registration process. FIG. 3B shows a process 320 of generating a key KAF in the AKMA process.

As shown in FIG. 3A, in a process in which UE 108 registers with a 5G core network, the UE 108 and an AUSF 102 perform a primary authentication process (311). After the primary authentication process, the AUSF 102 generates (312) an AKMA root key $K_{AKMA}$ by using an AUSF key $K_{AUSF}$ generated in the primary authentication process, and generates (313) key identifier information $K_{AKMA}$ ID of $K_{AKMA}$. The AUSF 102 further provides the generated AKMA root key $K_{AKMA}$ to an AAnF 201. The AAnF 201 generates a key KAF for an AF 107 based on the AKMA root key $K_{AKMA}$. On the UE side, the UE 108 generates (314) an AKMA root key $K_{AKMA}$ by using the AUSF key $K_{AUSF}$ generated in the primary authentication process and generates (315) a key identifier $K_{AKMA}$ ID of $K_{AKMA}$.

After the primary authentication is completed, the UE 108 initiates an AKMA service.

As shown in FIG. 3B, the UE 108 sends (311) an application session establishment request (Application Session Establishment Request) message to the AF 107, where the message includes the key identifier $K_{AKMA}$ ID.

In response to the received application session establishment request message, the AF 107 sends (312) a message to the AAnF 201 to request the key KAF. For example, the AF 107 may send a key request (Key Request) message to the AAnF 201 to request the key KAF. For example, for a service-based interface, the AF 107 may send another message with a service-based message name to the AAnF 201 to request the key KAF. The message sent by the AF 107 may include a key identifier $K_{AKMA}$ ID and an AF ID of the AF 107.

If an AKMA root key $K_{AKMA}$ corresponding to the key identifier $K_{AKMA}$ ID exists at the AAnF 201, the AAnF 201 may directly generate the key KAF and a validity period of KAF based on $K_{AKMA}$. If no AKMA root key $K_{AKMA}$ corresponding to the key identifier $K_{AKMA}$ ID exists at the AAnF 201, the AAnF 201 sends (313) a message to the AUSF 102 to request an AKMA root key $K_{AKMA}$. For example, the AAnF 201 may send an AKMA key request message to the AUSF 102 to request the AKMA root key $K_{AKMA}$. For example, for a service-based interface, the AAnF 201 may send another message with a service-based message name to the AUSF 102 to request the AKMA root key $K_{AKMA}$. The message sent by the AAnF 201 may include a key identifier $K_{AKMA}$ ID.

The AUSF 102 finds an AKMA root key $K_{AKMA}$ corresponding to the key identifier $K_{AKMA}$ ID. Then, the AUSF 102 includes the AKMA root key $K_{AKMA}$ in an AKMA key response message, and sends (314) the AKMA key response message to the AAnF 201. The AAnF 201 generates (315) the key KAF and the validity period of KAF based on the AKMA root key $K_{AKMA}$. The AAnF 201 includes the generated key KAF and the validity period of KAF in a key response message, and sends (316) the key response message to the AF 107. In response to the received key response message from the AAnF 201, the AF 107 sends (317) an application session establishment response message to the UE 108.

It can be learned from the foregoing description that, in an existing AKMA architecture, a key at a granularity of an AF identifier (ID) is negotiated between UE and an AF. Consequently, a key at a finer granularity cannot be negotiated between the UE and the AF. As a result, end-to-end security protection between the UE and the AF cannot be implemented for different service requirements.

Embodiments of this disclosure provide a communication protection solution. This solution can implement negotiation on a finer-grained key between the UE and the AF, thereby activating end-to-end security protection, such as confidentiality protection and/or integrity protection, on communications between the UE and the AF for different service requirements. Specifically, this solution can implement security capability negotiation between the UE and the AF, and can generate, based on a negotiation result, a key shared by the UE side and the AF side. The security capability negotiation includes: the UE and the AF negotiate whether to activate confidentiality protection and/or integrity protection on communication between the UE and the AF, the UE and the AF negotiate a confidentiality protection algorithm and/or an integrity protection algorithm to be jointly used by the UE and the AF, and so on. For a scenario in which a plurality of AFs share a same AF ID, this solution can separately generate corresponding keys to implement security isolation. An AF can perform key negotiation with the UE on behalf of other AFs. Therefore, it is not required that there be an interface between each AF and a PLMN. The solution enables generation of a plurality of levels of security keys (for example, confidentiality protection keys and/or integrity protection keys) based on different security requirements (for example, confidentiality protection requirements and/or integrity protection requirements) between the UE and the AF.

Figure 4A:
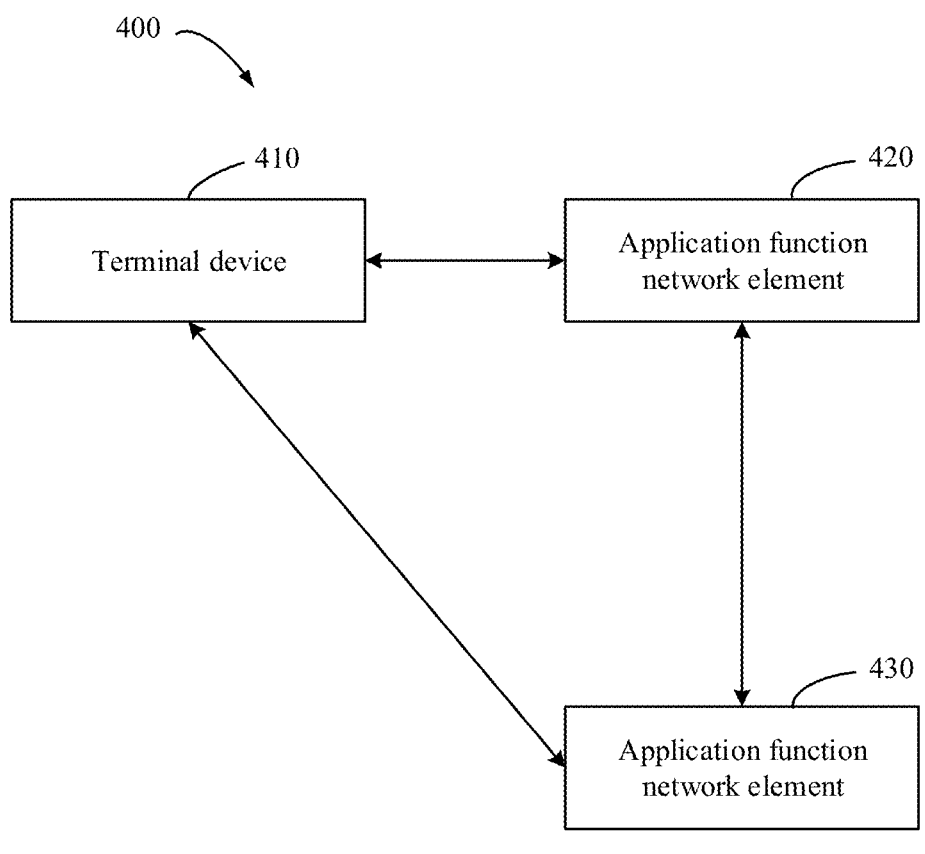
FIG. 4A is a block diagram of an example system to which embodiments of this disclosure can be applied.

FIG. 4A is a block diagram of an example system 400 to which embodiments of this disclosure can be applied. As shown in FIG. 4A, the system 400 may include a terminal device 410, an AF 420 (also referred to as a "first AF" below), and an AF 430 (also referred to as a "second AF" below).

In some embodiments, there may be an interface between the AF 420 and a PLMN. Additionally or optionally, there may be an interface or no interface between the AF 430 and the PLMN. In some embodiments, the AF 420 may be implemented on an operator side, while the AF 430 may be implemented on an enterprise side. Optionally, both the AF 420 and the AF 430 may be implemented on an operator side, or both the AF 420 and the AF 430 may be implemented on an enterprise side. In some embodiments, the AF 420 and the AF 430 may have a same AF ID. It should be understood that the AF 420 and the AF 430 may be implemented on different physical devices, or may be implemented on a same physical device. The scope of this disclosure is not limited in this aspect.

The UE 410 may send security capability information of the UE 410 to the AF 420. The security capability information may include a security algorithm, a security policy, and the like supported by the UE 410.

In this specification, the "security algorithm" may include an authentication algorithm, a confidentiality protection algorithm, an integrity algorithm, and/or the like. The "security policy" may indicate whether confidentiality protection and/or integrity protection are/is supported, which may be further subdivided into whether user plane/data plane confidentiality protection and/or integrity protection are/is supported, whether signaling plane confidentiality protection and/or integrity protection are/is supported, and the like.

In response to the received security capability information of the UE 410, the AF 420 may implement security negotiation between the UE 410 and the AF 420. The AF 420 may determine whether to activate security protection on communication between the UE 410 and the AF 420, and generate a security activation indication based on a determining result. The AF 420 may determine, based on the security policy supported by the UE 410 and a security policy supported by the AF 420, whether to activate the security protection, such as confidentiality protection and/or integrity protection, between the UE 410 and the AF 420. The AF 420 may determine, depending on whether a confidentiality protection algorithm supported by the UE 410 includes a confidentiality protection algorithm supported by the AF 420, whether to activate the confidentiality protection on the communication between the UE 410 and the AF 420, and/or determine, depending on whether an integrity algorithm supported by the UE 410 includes an integrity algorithm supported by the AF 420, whether to activate the integrity protection on the communication between the UE 410 and the AF 420. The AF 420 may generate the security activation indication based on the foregoing determining result, where the security activation indication indicates whether to activate the confidentiality protection and/or the integrity protection on the communication between the UE 410 and the AF 420. The AF 420 may select, based on the security algorithm supported by the UE 410 and a security algorithm supported by the AF 420, a security algorithm to be used by the UE 410 and the AF 420, including but not limited to an authentication algorithm, a confidentiality protection algorithm, and/or an integrity algorithm. Optionally, the AF 420 may generate the security activation indication based on the selected security algorithm, or the security activation indication may be implicitly indicated by the selected security algorithm. The AF 420 may generate, based on the selected security algorithm, a security key for protecting the communication between the UE 410 and the AF 420, and a key identifier and a validity period of the security key. Optionally, the security key for protecting the communication between the UE 410 and the AF 420 may not depend on the security algorithm, that is, an algorithm identifier of the security algorithm may not be used as an input parameter for generating the security key. The security key may include an AF key $K_{AF1}$ of the AF 420, and different levels of security keys generated based on the key $K_{AF1}$, including but not limited to an authentication key, a confidentiality protection key, and/or an integrity protection key. The key identifier is for identifying a security context between the UE 410 and the AF 420. The algorithm selection and the key generation may depend on the security activation indication. To be specific, corresponding algorithm selection and key generation are performed only when the security activation indication indicates to activate security protection on the communication between the UE 410 and the AF 420. Optionally, the algorithm selection and the key generation may not depend on the security activation indication. In this case, the security activation indication is only for activating use of a corresponding security algorithm and key.

In this way, the AF 420 may obtain a first security negotiation result between the UE 410 and the AF 420, where the first security negotiation result includes one or more of the following: the security activation indication for the security protection on the communication between the UE 410 and the AF 420, the security algorithm to be used by the UE 410 and the AF 420, the key identifier of the security key to be used by the UE 410 and the AF 420, and a key generation parameter.

In response to the received security capability information of the UE 410, the AF 420 may further implement security negotiation between the UE 410 and the AF 430. The AF 420 may determine whether to activate security protection on communication between the UE 410 and the AF 430, and generate a security activation indication based on a determining result. The AF 420 may determine, based on the security policy supported by the UE 410 and a security policy supported by the AF 430, whether to activate the security protection, such as confidentiality protection and/or integrity protection, between the UE 410 and the AF 430. The AF 420 may determine, depending on whether the confidentiality protection algorithm supported by the UE 410 includes a confidentiality protection algorithm supported by the AF 430, whether to activate the confidentiality protection on the communication between the UE 410 and the AF 430, and/or determine, depending on whether the integrity algorithm supported by the UE 410 includes an integrity algorithm supported by the AF 430, whether to activate the integrity protection on the communication between the UE 410 and the AF 430. The AF 420 may generate the security activation indication based on the foregoing determining result, where the security activation indication indicates whether to activate the confidentiality protection and/or the integrity protection on the communication between the UE 410 and the AF 430. The AF 420 may select, based on the security algorithm supported by the UE 410 and a security algorithm supported by the AF 430, a security algorithm to be used by the UE 410 and the AF 430, for example, a confidentiality protection algorithm and/or an integrity algorithm. Optionally, the AF 420 may generate the security activation indication based on the selected security algorithm, or the security activation indication may be implicitly indicated by the selected security algorithm. The AF 420 may generate, based on the selected security algorithm and a key generation parameter, a security key for protecting the communication between the UE 410 and the AF 430 and a key identifier of the security key. Optionally, the security key for protecting the communication between the UE 410 and the AF 430 may not depend on the security algorithm, that is, an algorithm identifier of the security algorithm may not be used as an input parameter for generating the security key. The security key may include an AF key $K_{AF2}$ of the AF 430, and an authentication key, a confidentiality protection key, and/or an integrity protection key generated based on the key $K_{AF2}$. The key identifier is for identifying a security context between the UE 410 and the AF 430. The algorithm selection and the key generation may depend on the security activation indication. To be specific, corresponding algorithm selection and key generation are performed only when the security activation indication indicates to activate security protection on the communication between the UE 410 and the AF 430. Optionally, the algorithm selection and the key generation may not depend on the security activation indication. In this case, the security activation indication is only for activating use of a corresponding security algorithm and key.

In this way, the AF 420 may obtain a second security negotiation result between the UE 410 and the AF 430, where the second security negotiation result includes one or more of the following: the security activation indication for the security protection on the communication between the UE 410 and the AF 430, the security algorithm to be used by the UE 410 and the AF 430, the key identifier of the security key to be used by the UE 410 and the AF 430, and the key generation parameter. The AF 420 may send the second security negotiation result to the AF 430.

Optionally, the AF 420 may send the security capability information of the UE 410, the key $K_{AF2}$, and the key identifier of the key to the AF 430, so that the AF 430 implements security negotiation between the UE 410 and the AF 430 by itself. The AF 430 may determine whether to activate security protection on communication between the UE 410 and the AF 430, and generate a security activation indication based on a determining result. The AF 430 may determine, based on the security policy supported by the UE 410 and a security policy supported by the AF 430, whether to activate the security protection, such as confidentiality protection and/or integrity protection, between the UE 410 and the AF 430. The AF 430 may determine, depending on whether the confidentiality protection algorithm supported by the UE 410 includes a confidentiality protection algorithm supported by the AF 430, whether to activate the confidentiality protection on the communication between the UE 410 and the AF 430, and/or determine, depending on whether the integrity algorithm supported by the UE 410 includes an integrity algorithm supported by the AF 430, whether to activate the integrity protection on the communication between the UE 410 and the AF 430. The AF 430 may generate the security activation indication based on the foregoing determining result, where the security activation indication indicates whether to activate the confidentiality protection and/or the integrity protection on the communication between the UE 410 and the AF 430. The AF 430 may select, based on the security algorithm supported by the UE 410 and a security algorithm supported by the AF 430, a security algorithm to be used by the UE 410 and the AF 430, for example, a confidentiality protection algorithm and/or an integrity algorithm. Optionally, the AF 430 may generate the security activation indication based on the selected security algorithm, or the security activation indication may be implicitly indicated by the selected security algorithm. The AF 430 may generate, based on the selected security algorithm and a key generation parameter, a security key for protecting the communication between the UE 410 and the AF 430 and a key identifier of the security key. Optionally, the security key for protecting the communication between the UE 410 and the AF 430 may not depend on the security algorithm, that is, an algorithm identifier of the security algorithm may not be used as an input parameter for generating the security key. The security key may include an authentication key, a confidentiality protection key, and/or an integrity protection key generated based on the key $K_{AF2}$. The key identifier is for identifying a security context between the UE 410 and the AF 430. The algorithm selection and the key generation may depend on the security activation indication. To be specific, corresponding algorithm selection and key generation are performed only when the security activation indication indicates to activate security protection on the communication between the UE 410 and the AF 430. Optionally, the algorithm selection and the key generation may not depend on the security activation indication. In this case, the security activation indication is only for activating use of a corresponding security algorithm and key.

In this way, the AF 430 may obtain a second security negotiation result between the UE 410 and the AF 430. The AF 430 may send the second security negotiation result to the AF 420.

The AF 420 may send the first security negotiation result and/or the second security negotiation result to the UE 410. The UE 410 may generate, based on some or all of the security algorithm, the key identifier, and the key generation parameter that are included in the first security negotiation result, a security key for protecting the communication between the UE 410 and the AF 420. The security key may include the AF key $K_{AF1}$ of the AF 420, and the authentication key, the confidentiality protection key, and/or the integrity protection key generated based on the key $K_{AF1}$. When the security activation indication indicates to activate the security protection on the communication between the UE 410 and the AF 420, the UE 410 may use the generated security key to perform the security protection on the communication between the UE 410 and the AF 420. The UE 410 may generate, based on the security algorithm, the key identifier, and the key generation parameter that are included in the second security negotiation result, a security key for protecting the communication between the UE 410 and the AF 430. The security key may include the AF key $K_{AF2}$ of the AF 430, and the authentication key, the confidentiality protection key, and/or the integrity protection key generated based on the key $K_{AF2}$. When the security activation indication indicates to activate the security protection on the communication between the UE 410 and the AF 430, the UE 410 may use the generated security key to perform the security protection on the communication between the UE 410 and the AF 430.

When the second security negotiation result is generated by the AF 420, the AF 420 may perform, by using the integrity protection key generated based on $K_{AF1}$, integrity protection on a message that is sent to the UE 410 and that carries the security negotiation result. For example, the message may include an integrity protection parameter generated based on the integrity protection key. The UE 410 may verify the integrity protection parameter in the message by using the integrity protection key generated based on $K_{AF1}$. When the verification succeeds, the UE 410 may send a reply message to the AF 420, where the reply message carries the integrity protection parameter generated by the UE 410 based on the integrity protection key. The AF 420 may verify the integrity protection parameter in the message by using the integrity protection key generated based on $K_{AF1}$. When the verification succeeds, if the security activation indication indicates to activate the security protection on the communication between the UE 410 and the AF 420, the UE 410 and the AF 420 may perform, based on the corresponding security key, the security protection, such as confidentiality protection and/or integrity protection, on the communication between the UE 410 and the AF 420. When the verification succeeds, if the security activation indication indicates to activate the security protection on the communication between the UE 410 and the AF 430, the AF 420 may send an activation message to the AF 430 to indicate to the AF 430 to activate end-to-end security protection on the communication between the UE 410 and the AF 430. In this way, the UE 410 and the AF 430 may perform, based on the corresponding security key, the security protection, such as confidentiality protection and/or integrity protection, on the communication between the UE 410 and the AF 430.

When the second security negotiation result is generated by the AF 430, the AF 430 may perform, by using the integrity protection key generated based on $K_{AF2}$, integrity protection on a message that is sent to the UE 410 via the AF 420 and that carries the security negotiation result. For example, the message may include an integrity protection parameter generated based on the integrity protection key. The UE 410 may verify the integrity protection parameter in the message by using the integrity protection key generated based on $K_{AF2}$. When the verification succeeds, the UE 410 may send a reply message to the AF 430 via the AF 420, where the reply message carries the integrity protection parameter generated by the UE 410 based on the integrity protection key. The AF 430 may verify the integrity protection parameter in the message by using the integrity protection key generated based on $K_{AF2}$. When the verification succeeds, in response to the security activation indication that indicates to activate the security protection on the communication between the UE 410 and the AF 430, the UE 410 and the AF 430 may perform, based on the corresponding security key, the security protection, such as confidentiality protection and/or integrity protection, on the communication between the UE 410 and the AF 430.

Figure 4B:
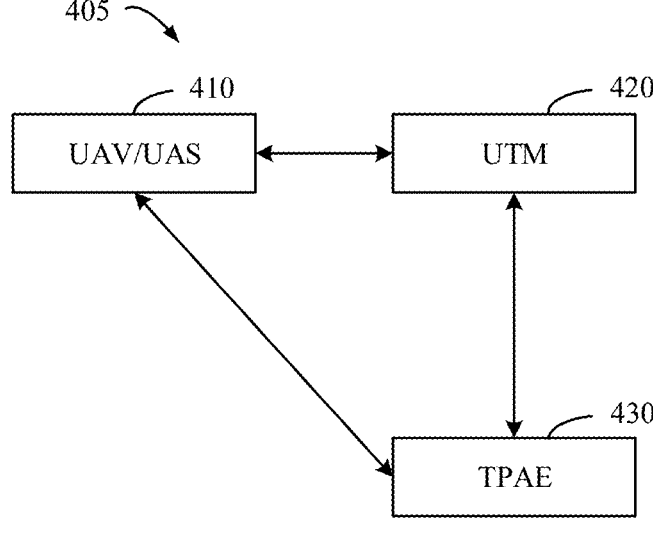
FIG. 4B is a schematic diagram of an example application scenario to which embodiments of this disclosure can be applied.

FIG. 4B is a schematic diagram of an example application scenario 405 to which embodiments of this disclosure can be applied. In FIG. 4B, the UE 410 shown in FIG. 4A is implemented as an uncrewed aerial vehicle (UAV), the AF 420 is implemented as an uncrewed aircraft system management (UncrewedAircraft System Traffic Management, UTM) entity, and the AF 430 is implemented as a third-party authorized entity (TPAE). It should be understood that, in some implementations, the application scenario 405 may include one or more TPAEs 430. The scope of this disclosure is not limited in this aspect.

The UAV 410 may use a 3GPP system to communicate with the UTM 420 and the TPAE 430. The TPAE 430 may serve as an authorized third-party organization to perform digital service management on the uncrewed aerial vehicle, and obtain information such as an identity, a location, and a speed of the UAV 410 by exchanging information with the UAV 410, to monitor and manage the UAV. The UAV 410 and the TPAE 430 may communicate with each other through a UAV7 interface, including but not limited to in a broadcast manner. When the UAV 410 communicates with the TPAE 430 through the UAV7 interface, information content sent by the UAV 410 may include information such as the identity, the location, and the speed of the UAV 410. Main functions of the UTM 420 include but are not limited to performing UAV supervision, including identity management, tracking, statistics collection, and the like, and may be implemented by a supervision cloud platform. The UAV 410 and the UTM 420 communicate with each other through a UAV9 interface.

The UTM 420 and the TPAE 430 may use a same AF ID. Embodiments of this disclosure can implement end-to-end security protection between the UAV 410 and the UTM 420 and end-to-end security protection between the UAV 410 and the TPAE 430, including confidentiality protection and/or integrity protection. A key used between the UAV 410 and the UTM 420 is different from a key used between the UAV 410 and the TPAE 430. The following further describes various embodiments of this disclosure in detail with reference to the example scenario shown in FIG. 4B.

Figure 5:
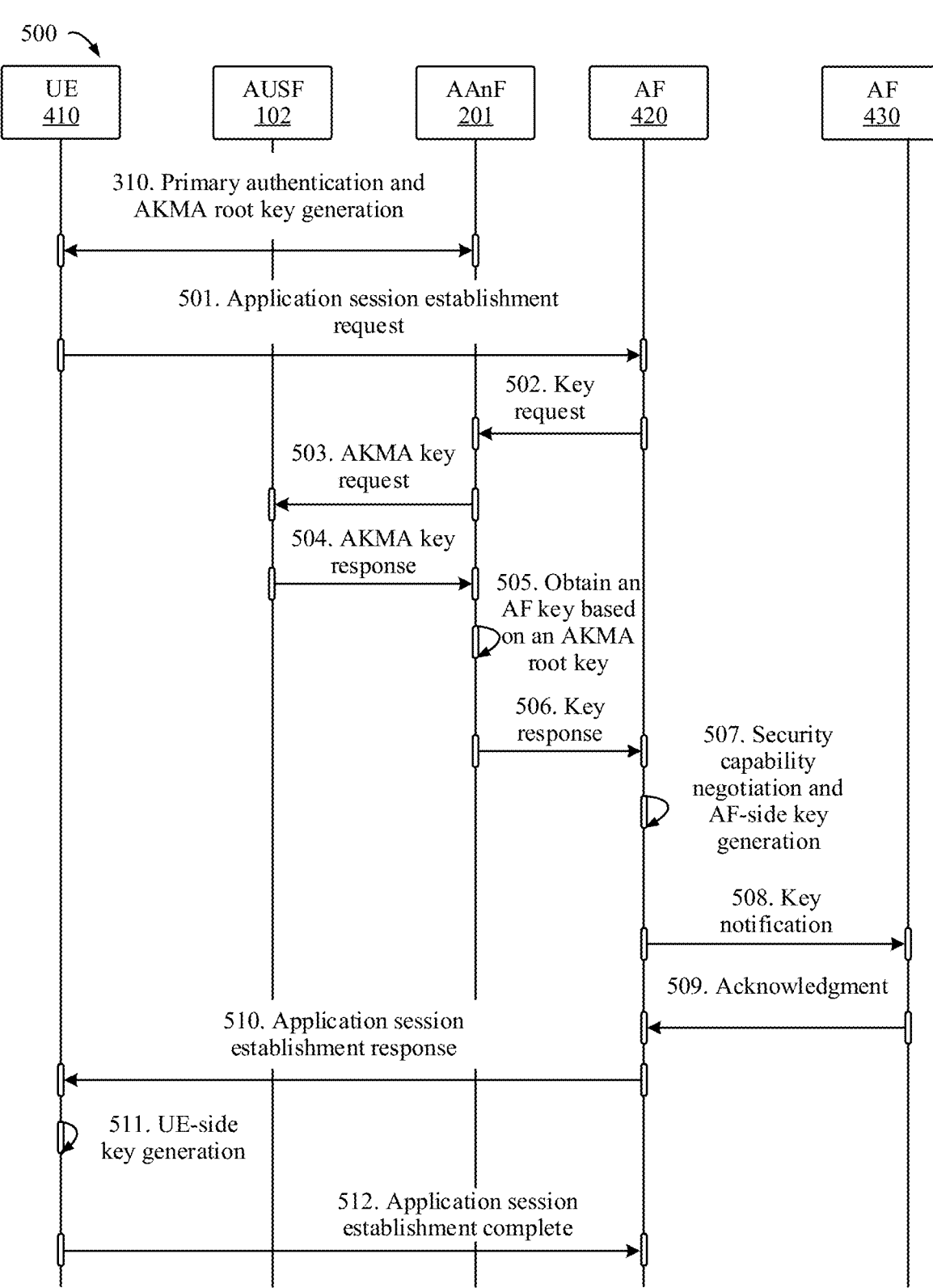
FIG. 5 is a signaling exchange diagram of an example communication protection process according to an embodiment of this disclosure.

FIG. 5 is a signaling exchange diagram of an example communication protection process 500 according to an embodiment of this disclosure. In the example shown in FIG. 5, an AF 420 replaces an AF 430 for algorithm selection and key generation.

As shown in FIG. 5, primary authentication (310) is completed between UE 410 and an AAnF 105 to generate an AKMA root key $K_{AKMA}$ and a key identifier $K_{AKMA}$ ID thereof. A process of the primary authentication is the same as the process 310 shown in FIG. 3. Details are not described herein again.

The UE 410 may send (501) an application session establishment request (Application Session Establishment Request) message to the AF 420. In some embodiments, the application session establishment request message may include the key identifier $K_{AKMA}$ ID.

Additionally or optionally, the application session establishment request message may include identification information of the AF 430, so that the AF 420 selects the AF 430 based on the identification information. The identification information may be a name or an ID of the AF 430.

Additionally or optionally, the application session establishment request message may further include security capability information of the UE 410. The security capability information may include a security algorithm, a security policy, and the like supported by the UE 410. The security algorithm may include an authentication algorithm, a confidentiality protection algorithm, an integrity algorithm, and/or the like. The authentication algorithm may be, for example, an EAP-TLS algorithm. The security policy includes whether the UE 410 supports confidentiality protection and/or integrity protection, which may be further subdivided into whether user plane/data plane confidentiality protection and/or integrity protection are/is supported, and whether signaling plane confidentiality protection and/or or integrity protection are/is supported. Optionally, the security capability information may further include a security capability identifier, a client software version of the AF 420 or the AF 430 at the UE 410, and/or the like.

Additionally or optionally, the application session establishment request message may further include a key generation parameter to be used by the UE 410, for sharing with the AF 420 and the AF 430. The key generation parameter may include at least one of the following: identity information used by the UE 410 in the AF 420 and/or the AF 430, a service type requested by the UE 410, identification information of the AF 430, a freshness parameter, a data network name (Data Network Name, DNN), or the like.

The identity information may be a username, a user ID, or the like used by the UE 410 in the AF 420 or the AF 430. For example, if the UE 410 has registered a plurality of usernames in the AF 420 or the AF 430, the identity information may indicate any one of the plurality of usernames. The identity information helps implementing security isolation between different usernames. For example, it is assumed that the UE 410 is a public device, and a user A and a user B separately use the UE to negotiate with an AF for a key. In the existing solution, a key of the user A and a key of the user B will be the same because they use the same UE.

Using the identity information of the UE as the key generation parameter can implement security isolation between different usernames.

Examples of the service type may include but are not limited to an uncrewed aerial vehicle service, a positioning service, and the like. Using the service type as the key generation parameter helps implementing data security isolation between different service types.

The identification information of the AF 430 may be an application name, a department name, or an ID of the AF 430. Tencent services are used as an example. Different applications such as WeChat™ and QQ™ may exist under a same AF ID. Using an application name as the key generation parameter helps implementing data security isolation between different applications. The uncrewed aerial vehicle application scenario shown in FIG. 4B is used as an example. Examples of the identification information of the AF 430 include but are not limited to a TAPE, a UAV flight management subsystem (UFMS), a UAV service supplier (USS), a civil aviation authority, and the like. The AF 420 may select the AF 430 based on the identification information of the AP 430.

The freshness parameter may be a random number, a count value, or the like locally generated by the UE 410. The freshness parameter helps implementing a customized key update periodicity. Otherwise, update periodicities of different levels of generated security keys are limited by an AF key update periodicity, that is, the update periodicities of the different levels of generated security keys are at most consistent with the AF key update periodicity.

In response to the received application session establishment request message, the AF 420 may store the security capability information of the UE and the key generation parameter that are carried in the message. Then, the AF 420 sends (502) a message to the AAnF 201 to request an AF key $K_{AF1}$ of the AF 420. For example, the AF 420 may send a key requestmessage to the AAnF 201 to request the key $K_{AF1}$. For example, for a service-based interface, the AF 420 may send another message with a service-based message name to the AAnF 201 to request the key $K_{AF1}$. The message sent by the AF 420 may include a key identifier $K_{AKMA}$ ID and an AF ID of the AF 420.

If an AKMA root key $K_{AKMA}$ corresponding to the key identifier $K_{AKMA}$ ID exists at the AAnF 201, the AAnF 201 may directly generate the key $K_{AF1}$ and a validity period of $K_{AF1}$ based on $K_{AKMA}$. If no AKMA root key $K_{AKMA}$ corresponding to the key identifier $K_{AKMA}$ ID exists at the AAnF 201, the AAnF 201 sends (503) a message to the AUSF 102 to request an AKMA root key $K_{AKMA}$. For example, the AAnF 201 may send an AKMA key requestmessage to the AUSF 102 to request the AKMA root key $K_{AKMA}$. For example, for a service-based interface, the AAnF 201 may send another message with a service-based message name to the AUSF 102 to request the AKMA root key $K_{AKMA}$. The message sent by the AAnF 201 may include a key identifier $K_{AKMA}$ ID.

The AUSF 102 finds an AKMA root key $K_{AKMA}$ corresponding to the key identifier $K_{AKMA}$ ID. Then, the AUSF 102 includes the AKMA root key $K_{AKMA}$ in an AKMA key response message, and sends (504) the AKMA key response message to the AAnF 201. The AAnF 201 generates (505) the AF key $K_{AF1}$ of the AF 420 and the validity period of $K_{AF1}$ based on the AKMA root key $K_{AKMA}$. The AAnF 201 includes the generated key $K_{AF1}$ and the validity period of $K_{AF1}$ in a key response message, and sends (506) the key response message to the AF 420. It should be understood that the signaling exchange process shown in steps 502 to

506 in FIG. 5 is the same as the signaling exchange processes shown in steps 312 to 316 in FIG. 3. Details are not described herein again.

As shown in FIG. 5, the AF 420 may separately implement security negotiation (507) between the AF 420 and the UE 410, to obtain a first security negotiation result. The first security negotiation result may include one or more of the following: a security activation indication for security protection on communication between the UE 410 and the AF 420, a security algorithm to be used by the UE 410 and the AF 420, a key identifier of a security key to be used by the UE 410 and the AF 420, and the key generation parameter.

It should be understood that although a security negotiation process shown in steps 507 to 512 in FIG. 5 is shown after the AKMA procedure shown in steps 502 to 506, this is merely an example implementation of this disclosure, and does not imply a limitation on the scope of this disclosure. In another implementation of this disclosure, the security negotiation process shown in steps 507 to 512 may not depend on the foregoing steps 502 to 506. In other words, the security negotiation process may be applied to the AKMA procedure, or may be independent of the AKMA procedure.

In some embodiments, the AF 420 may determine whether to activate the security protection on the communication between the UE 410 and the AF 420, and generate the security activation indication based on a determining result. The AF 420 may determine, based on the security policy supported by the UE 410 and a security policy supported by the AF 420, whether to activate the security protection, such as confidentiality protection and/or integrity protection, on communications between the UE 410 and the AF 420, and generate the security activation indication based on the determining result. For example, if the UE 410 supports confidentiality protection and the AF 420 also supports confidentiality protection, the AF 420 may determine that the confidentiality protection on the communication between the UE 410 and the AF 420 needs to be activated. If either does not support confidentiality protection, the AF 420 may determine that the confidentiality protection on the communication between the UE 410 and the AF 420 does not need to be activated. For another example, if the UE 410 supports integrity protection and the AF 420 also supports integrity protection, the AF 420 may determine that the integrity protection on the communication between the UE 410 and the AF 420 needs to be activated. If either one does not support integrity protection, the AF 420 may determine that the integrity protection on the communication between the UE 410 and the AF 420 does not need to be activated. Optionally, the AF 420 may determine, depending on whether a confidentiality protection algorithm supported by the UE 410 includes a confidentiality protection algorithm supported by the AF 420, whether to activate the confidentiality protection on the communication between the UE 410 and the AF 420, and/or determine, depending on whether an integrity algorithm supported by the UE 410 includes an integrity algorithm supported by the AF 420, whether to activate the integrity protection on the communication between the UE 410 and the AF 420. The AF 420 may generate the security activation indication based on the foregoing determining result, where the security activation indication indicates whether to activate the confidentiality protection and/or the integrity protection on the communication between the UE 410 and the AF 420.

In some embodiments, the security activation indication generated by the AF 420 includes a confidentiality protection indication and/or an integrity protection indication. A representation form of the security activation indication may be an explicit indication. For example, '11' indicates that both confidentiality protection and integrity protection are activated; '10' indicates that confidentiality protection is activated but integrity protection is not activated; '00' indicates that neither confidentiality protection nor integrity protection is activated; and '01' indicates that confidentiality protection is not activated but integrity protection is activated. Optionally, the security activation indication may be implicitly represented by a selected security algorithm. When a selected confidentiality protection algorithm is null, it indicates that confidentiality protection is not activated; when the selected confidentiality protection algorithm is non-null, it indicates that confidentiality protection is activated; when the selected integrity protection algorithm is null, it indicates that integrity protection is not activated; and when the selected integrity protection algorithm is non-null, it indicates that integrity protection is activated. For example, information about the selected security algorithm returned by the AF 420 to the UE 410 through an application session establishment response message may be "NIA=integrity protection algorithm 1, NEA=confidentiality protection algorithm 2", where the information indicates that an integrity protection algorithm 1 is used to activate the integrity protection and a confidentiality protection algorithm 2 is used to activate the confidentiality protection. For another example, information about the selected security algorithm returned by the AF 420 to the UE 410 through an application session establishment response message may be "NIA=null, NEA=confidentiality protection algorithm 3", where the information indicates that the integrity protection is not activated and a confidentiality protection algorithm 3 is used to activate the confidentiality protection. For another example, information about the selected security algorithm returned by the AF 420 to the UE 410 through an application session establishment response message may be "NIA=integrity protection algorithm 4, NEA=confidentiality protection algorithm 5", where the information indicates that an integrity protection algorithm 4 is used to activate the integrity protection and a confidentiality protection algorithm 5 is used to activate the confidentiality protection. For another example, the information about the selected security algorithm returned by the AF 420 to the UE 410 through an application session establishment response message may be "NIA=integrity protection algorithm 6, NEA=NULL", where the information indicates that an integrity protection algorithm 6 is used to activate the integrity protection and the confidentiality protection is not activated.

In some embodiments, the AF 420 may select, based on the security algorithm supported by the UE 410 and a security algorithm supported by the AF 420, a security algorithm to be used by the UE 410 and the AF 420, including but not limited to an authentication algorithm, a confidentiality protection algorithm, and/or an integrity algorithm. For example, the AF 420 may determine security algorithms jointly supported by the UE 410 and the AF 420, and prioritize the security algorithms, where a security algorithm with the highest priority is selected. The AF 420 may generate, based on the selected security algorithm, a security key for protecting the communication between the UE 410 and the AF 420, and a key identifier of the security key.

In some embodiments, the security key may include different levels of security keys generated based on the AF key $K_{AF1}$ of the AF 420, including but not limited to an authentication key, a confidentiality protection key, and/or an integrity protection key. For example, the AF 420 may generate an authentication key based on the key $K_{AF1}$ and an identifier of the selected authentication algorithm, where the authentication key is for implementing authentication between the UE 410 and the AF 420. The AF 420 may generate a confidentiality protection key based on the key $K_{AF1}$ and an identifier of the selected confidentiality protection algorithm, where the confidentiality protection key is for implementing encryption and decryption on communication content between the UE 410 and the AF 420. The AF 420 may generate an integrity protection key based on the key $K_{AF1}$ and an identifier of the selected integrity algorithm, where the integrity protection key is for implementing integrity protection and verification on the communication content between the UE 410 and the AF 420.

In some embodiments, the algorithm selection and the key generation may depend on the security activation indication. That is, corresponding algorithm selection and key generation are performed only when the security activation indication indicates to activate security protection on the communication between the UE 410 and the AF 420. Optionally, the algorithm selection and the key generation may not depend on the security activation indication. In this case, the security activation indication is only for activating the use of a corresponding security algorithm and key.

In addition, as shown in FIG. 5, the AF 420 may implement security negotiation (507) between the AF 430 and the UE 410, to obtain a second security negotiation result. The second security negotiation result may include one or more of the following: a security activation indication for security protection on communication between the UE 410 and the AF 430, a security algorithm to be used by the UE 410 and the AF 430, a key identifier of a security key to be used by the UE 410 and the AF 430, and the key generation parameter.

In some embodiments, the AF 420 may determine, based on the identification information of the AF 430 included in the application session establishment request message, the AF 430 to be accessed by the UE 410. Optionally, the AF 420 may select the AF 430 based on attribute information of the UE 410. For example, the attribute information may be location information, load information, or the like. The uncrewed aerial vehicle scenario 405 shown in FIG. 4B is used as an example. When the application scenario 405 includes a plurality of TPAEs, keys of all the TPAEs may be the same; or keys of TPAEs in a specific area may be the same but keys of TPAEs in different areas may be different. When an area is used as a granularity, a UTM can determine, based on a current location of a UAV, an area in which the UAV is located and select, based on area information, a TPAE that serves the UAV.

In some embodiments, the AF 420 may determine whether to activate security protection on the communication between the UE 410 and the AF 430, and generate a security activation indication based on a determining result. The AF 420 may determine, based on the security policy supported by the UE 410 and a security policy supported by the AF 430, whether to activate the security protection, such as confidentiality protection and/or integrity protection, between the UE 410 and the AF 430, and generate the security activation indication based on the determining result. For example, if the UE 410 supports confidentiality protection and the AF 430 also supports confidentiality protection, the AF 420 may determine that the confidentiality protection on the communication between the UE 410 and the AF 430 needs to be activated. If either does not support confidentiality protection, the AF 420 may determine that the confidentiality protection on the communication between the UE 410 and the AF 430 does not need to be activated. For another example, if the UE 410 supports integrity protection and the AF 430 also supports integrity protection, the AF 420 may determine that the integrity protection on the communication between the UE 410 and the AF 430 needs to be activated. If either does not support integrity protection, the AF 420 may determine that the integrity protection on the communication between the UE 410 and the AF 430 does not need to be activated. Optionally, the AF 420 may determine, depending on whether the confidentiality protection algorithm supported by the UE 410 includes a confidentiality protection algorithm supported by the AF 430, whether to activate the confidentiality protection on the communication between the UE 410 and the AF 430, and/or determine, depending on whether the integrity algorithm supported by the UE 410 includes an integrity algorithm supported by the AF 430, whether to activate the integrity protection on the communication between the UE 410 and the AF 430. The AF 420 may generate the security activation indication based on the foregoing determining result, where the security activation indication indicates whether to activate the confidentiality protection and/or the integrity protection on the communication between the UE 410 and the AF 430.

In some embodiments, the security activation indication generated by the AF 420 includes a confidentiality protection indication and/or an integrity protection indication. A representation form of the security activation indication may be an explicit indication. For example, '11' indicates that both confidentiality protection and integrity protection are activated; '10' indicates that confidentiality protection is activated but integrity protection is not activated; '00' indicates that neither confidentiality protection nor integrity protection is activated; and '01' indicates that confidentiality protection is not activated but integrity protection is activated. Optionally, the security activation indication may be implicitly represented by a selected security algorithm. When a selected confidentiality protection algorithm is null, it indicates that confidentiality protection is not activated; when the selected confidentiality protection algorithm is non-null, it indicates that confidentiality protection is activated; when the selected integrity protection algorithm is null, it indicates that integrity protection is not activated; and when the selected integrity protection algorithm is non-null, it indicates that integrity protection is activated. For example, information about the selected security algorithm returned by the AF 420 to the UE 410 through an application session establishment response message may be "NIA=integrity protection algorithm 1, NEA=confidentiality protection algorithm 2", where the information indicates that an integrity protection algorithm 1 is used to activate the integrity protection and a confidentiality protection algorithm 2 is used to activate the confidentiality protection. For another example, information about the selected security algorithm returned by the AF 420 to the UE 410 through an application session establishment response message may be "NIA=null, NEA=confidentiality protection algorithm 3", where the information indicates that the integrity protection is not activated and a confidentiality protection algorithm 3 is used to activate the confidentiality protection. For another example, the information about the selected security algorithm returned by the AF 420 to the UE 410 through an application session establishment response message may be "NIA=integrity protection algorithm 4, NEA=confidentiality protection algorithm 5", where the information indicates that an integrity protection algorithm 4 is used to activate the integrity protection and a confidentiality protection algorithm 5 is used to activate the confidentiality protection. For another example, information about the selected security algorithm returned by the AF 420 to the UE 410 through an application session establishment response message may be "NIA=integrity protection algorithm 6, NEA=NULL", where the information indicates that an integrity protection algorithm 6 is used to activate the integrity protection and the confidentiality protection is not activated.

In some embodiments, the AF 420 may select, based on the security algorithm supported by the UE 410 and a security algorithm supported by the AF 430, a security algorithm to be used by the UE 410 and the AF 430, including but not limited to an authentication algorithm, a confidentiality protection algorithm, and/or an integrity algorithm. The security algorithm supported by the AF 430 may be preconfigured at the AF 420 or may be obtained by querying the AF 430 by the AF 420. For example, the AF 420 may determine security algorithms jointly supported by the UE 410 and the AF 430, and prioritize the security algorithms, where a security algorithm with a highest priority is selected. The AF 420 may generate, based on the selected security algorithm and a key generation parameter, a security key for protecting the communication between the UE 410 and the AF 430 and a key identifier of the security key.

In some embodiments, the security key may include an AF key $K_{AF2}$ of the AF 430, and different levels of security keys generated based on the AF key $K_{AF2}$ of the AF 430, including but not limited to an authentication key, a confidentiality protection key, and/or an integrity protection key. For example, the AF 420 may generate the AF key $K_{AF2}$ of the AF 430 based on the AF key $K_{AF1}$ of the AF 420 and a key generation parameter. The AF 420 may generate an authentication key based on the key $K_{AF2}$ and an identifier of the selected authentication algorithm, where the authentication key is for implementing authentication between the UE 410 and the AF 430. The AF 420 may generate a confidentiality protection key based on the key $K_{AF2}$ and an identifier of the selected confidentiality protection algorithm, where the confidentiality protection key is for implementing encryption and decryption on communication content between the UE 410 and the AF 430. The AF 420 may generate an integrity protection key based on the key $K_{AF2}$ and an identifier of the selected integrity algorithm, where the integrity protection key is for implementing integrity protection and verification on the communication content between the UE 410 and the AF 430.

In some embodiments, the key generation parameter used by the AF 420 in generating the AF key $K_{AF2}$ of the AF 430 may be the key generation parameter shared by the UE 410 in the application session establishment request message. Optionally, the key generation parameter used by the AF 420 may be a key generation parameter generated by the AF 420 or the AF 430. For example, the key generation parameter generated by the AF 420 may include at least one selected from the following: identity information used by the UE 410 in the AF 420 and/or the AF 430, a service type requested by the UE 410, identification information of the AF 430, a freshness parameter, a data network name (DNN), or the like. The freshness parameter may be a random number, a count value, or the like generated by the AF 420.

In some embodiments, the algorithm selection and the key generation may depend on the security activation indication. To be specific, corresponding algorithm selection and key generation are performed only when the security activation indication indicates to activate security protection on the communication between the UE 410 and the AF 430. Optionally, the algorithm selection and the key generation may not depend on the security activation indication. In this case, the security activation indication is only for activating use of a corresponding security algorithm and key.

As shown in FIG. 5, the AF 420 may send (508) a key notification message to the AF 430, to indicate the second security negotiation result to the AF 430. The key notification message may include a security key of the AF 430, for example, the AF key $K_{AF2}$ of the AF 430, and different levels of security keys generated based on the AF key $K_{AF2}$ of the AF 430. In response to the received key notification message, the AF 430 may store a part or all of the second security negotiation result and the security key of the AF 430. After receiving an activation message from the AF 420, the AF 430 may perform security protection on the communication between the UE 410 and the AF 430 by using a corresponding security algorithm and/or key based on the security activation indication in the second security negotiation result.

As shown in FIG. 5, the AF 430 may send (509) an acknowledgment message for the key notification message to the AF 420. The AF 420 may send (510) an application session establishment response message to the UE 410.

In some embodiments, the application session establishment response message may include the first security negotiation result and/or the second security negotiation result. As mentioned above, the first security negotiation result may include one or more selected from the following: the security activation indication for the security protection on the communication between the UE 410 and the AF 420, the security algorithm to be used by the UE 410 and the AF 420, the key identifier of the security key to be used by the UE 410 and the AF 420, and the key generation parameter. The second security negotiation result may include one or more selected from the following: the security activation indication for the security protection on the communication between the UE 410 and the AF 430, the security algorithm to be used by the UE 410 and the AF 430, the key identifier of the security key to be used by the UE 410 and the AF 430, the key generation parameter, and a key identifier of a corresponding key generated based on the first security negotiation result. The UE 410 may store a part or all of the first security negotiation result and/or the second security negotiation result.

In some embodiments, the first security negotiation result and/or the second security negotiation result may be carried in another downlink application session message.

In some embodiments, the AF 420 may determine, based on the key $K_{AF1}$, an integrity protection key for protecting the application session establishment response message. The integrity protection key may be the key $K_{AF1}$ or a key derived from $K_{AF1}$. The AF 420 may calculate a hash value MAC1 of the application session establishment response message by using the integrity protection key, to protect integrity of the application session establishment response message. The hash value MAC1 may be sent to the UE 410 together with the application session establishment response message.

In response to the received application session establishment response message from the AF 420, the UE 410 may generate (511) a key on the UE 410 side in the same manner as the AF 420.

In some embodiments, the UE 410 may generate a first root key KAF based on the AKMA root key $K_{AKMA}$ obtained in the primary authentication process. In response to the received hash value MAC1 sent together with the application session establishment response message from the AF 420, the UE 410 may determine, based on the first root key KAF in the same manner as the AF 420, an integrity protection key for verifying the application session establishment response message. The UE 410 may calculate a hash value of the application session establishment response message based on the integrity protection key and compare the hash value with the received hash value MAC1. If the two values are the same, it indicates that the application session establishment response message has not been tampered with. If the two values are different, it indicates that the application session establishment response has been tampered with. In this way, the UE 410 can verify integrity of the application session establishment response message.

In some embodiments, for example, when the integrity verification succeeds, if the application session establishment response message includes the first security negotiation result, the UE 410 may generate, based on the first security negotiation result in the same manner as the AF 420, a security key for protecting the communication between the UE 410 and the AF 420. If the application session establishment response message includes the second security negotiation result, the UE 410 may generate, based on the second security negotiation result in the same manner as the AF 420, a security key for protecting the communication between the UE 410 and the AF 430.

As shown in FIG. 5, the UE 410 may send (512) an application session establishment complete message to the AF 420.

In some embodiments, the UE 410 may calculate a hash value MAC2 of the application session establishment complete message by using the determined integrity protection key, to protect integrity of the application session establishment complete message. The hash value MAC2 may be sent to the AF 420 together with the application session establishment complete message. In response to the received application session establishment complete message and the received hash value MAC2, the AF 420 may calculate a hash value of the application session establishment complete message based on the same integrity protection key, and compare the hash value with the received hash value MAC2. If the two values are the same, it indicates that the application session establishment complete message has not been tampered with. If the two values are different, it indicates that the application session establishment complete message has been tampered with. In this way, the AF 420 can verify integrity of the application session establishment complete message.

In some embodiments, for example, when integrity of the application session establishment complete message is verified, if the security activation indication in the first security negotiation result indicates to activate the security protection on the communication between the UE 410 and the AF 420, the UE 410 and the AF 420 may perform end-to-end security protection on the communication between the UE 410 and the AF 420 based on the security algorithm and the corresponding key in the first security negotiation result. For example, if the security activation indication indicates to activate the confidentiality protection on the communication between the UE 410 and the AF 420, the UE 410 may use a confidentiality protection algorithm and a confidentiality protection key in the first security negotiation result to encrypt a message/data sent to the AF 420. The AF 420 may decrypt the received message/data based on the confidentiality protection algorithm and the confidentiality protection key in the first security negotiation result. If the security activation indication activates the confidentiality protection on the communication between the UE 410 and the AF 420, the AF 420 may use a confidentiality protection algorithm and a confidentiality protection key in the first security negotiation result to encrypt a message/data sent to the UE 410. The UE 410 may decrypt the received message/data based on the confidentiality protection algorithm and the confidentiality protection key in the first security negotiation result. If the security activation indication activates the integrity protection on the communication between the UE 410 and the AF 420, the UE 410 may use the integrity algorithm and the integrity protection key in the first security negotiation result to perform integrity protection on a message/data sent to the AF 420. The AF 420 may verify integrity of the received message/data based on the integrity algorithm and the integrity protection key in the first security negotiation result. The AF 420 may use the integrity algorithm and the integrity protection key in the first security negotiation result to perform integrity protection on the message/data sent to the UE 410, and the UE 410 may verify integrity of the received message/data based on the integrity algorithm and the integrity protection key in the first security negotiation result.

In some embodiments, the AF 420 may send an activation message to the AF 430, to indicate to the AF 430 to activate end-to-end security protection between the UE 410 and the AF 430 based on the second security negotiation result.

In some embodiments, if the security activation indication in the second security negotiation result indicates to activate the security protection on the communication between the UE 410 and the AF 430, the UE 410 and the AF 430 may perform end-to-end security protection on the communication between the UE 410 and the AF 430 based on the security algorithm and the corresponding key in the second security negotiation result. For example, if the security activation indication activates the confidentiality protection on the communication between the UE 410 and the AF 430, the UE 410 may use a confidentiality protection algorithm and a confidentiality protection key in the second security negotiation result to encrypt a message/data sent to the AF 430. The AF 430 may decrypt the received message/data based on the confidentiality protection algorithm and the confidentiality protection key in the second security negotiation result. If the security activation indication activates the confidentiality protection on the communication between the UE 410 and the AF 430, the AF 430 may use a confidentiality protection algorithm and a confidentiality protection key in the second security negotiation result to encrypt a message/data sent to the UE 410. The UE 410 may decrypt the received message/data based on the confidentiality protection algorithm and the confidentiality protection key in the second security negotiation result. If the security activation indication activates the integrity protection on the communication between the UE 410 and the AF 430, the UE 410 may use the integrity algorithm and the integrity protection key in the second security negotiation result to perform integrity protection on a message/data sent to the AF 430. The AF 430 may verify integrity of the received message/data based on the integrity algorithm and the integrity protection key in the second security negotiation result. The AF 430 may use the integrity algorithm and the integrity protection key in the second security negotiation result to perform integrity protection on the message/data sent to the UE 410, and the UE 410 may verify the integrity of the received message/data based on the integrity algorithm and the integrity protection key in the second security negotiation result.

The uncrewed aerial vehicle application scenario shown in FIG. 4B is used as an example. The UAV may perform security protection on a broadcast message by using the negotiated security key and security algorithm. After receiving the broadcast message, and the TPAE performs security deprotection on the broadcast message by using a corresponding key and security algorithm, to obtain a plaintext of the broadcast message. The broadcast message may include some or all of the following parameters: identification information of the UAV, a key identifier, an encrypted ciphertext, a message verification code for integrity protection, and the like.

Figure 6:
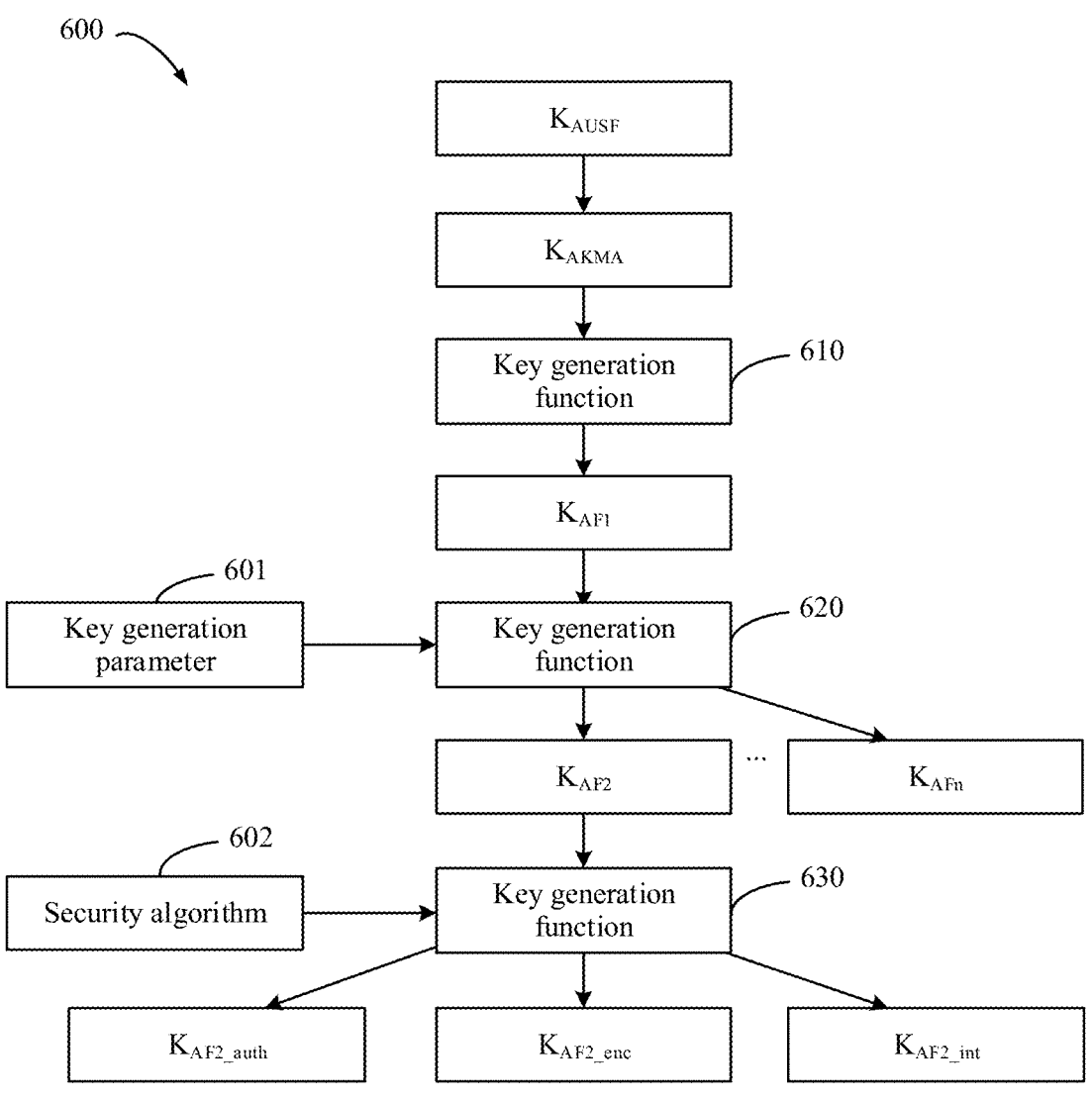
FIG. 6 is a block diagram of an example key architecture according to an embodiment of this disclosure.

FIG. 6 is a block diagram of an example key architecture 600 according to an embodiment of this disclosure. The example key architecture 600 illustrates a key generation manner according to an embodiment of this disclosure. As shown in FIG. 6, an AKMA root key $K_{AKMA}$ is generated based on a key $K_{AUSF}$ generated in a primary authentication process. A key generation function 610 may generate an AF key $K_{AF1}$ for an AF 420 based on the AKMA root key $K_{AKMA}$. For example, the key generation function 610 may be pre-configured at UE 410 and the AF 420. A key generation function 620 may generate their respective root keys $K_{AF2}$, $K_{AF3}$, . . . , and $K_{AFn}$ (where n≥2) for a plurality of AFs (for example, including an AF 430) with a same AF ID based on the key $K_{AF1}$ and a key generation parameter 601. For example, the key generation function 620 may be pre-configured at UE 410 and the AF 420 or the AF 430. A key generation function 630 may generate a plurality of security keys based on an AF key $K_{AF2}$ for the AF 430 and a security algorithm 602 to be used by the UE 410 and the AF 430, including but not limited to an authentication key $K_{AF2\_auth}$, a confidentiality protection key $K_{AF2}$_enc, and/or an integrity protection key $K_{AF2}$_int. Alternatively, the key generation function 620 may generate their respective root keys $K_{AF2}$, $K_{AF3}$, . . . , and $K_{AFn}$ (where n≥2) for a same AF (for example, including the AF 420) based on the key $K_{AF1}$ and a key generation parameter 601. For example, when the key generation parameter 601 is identity information, the key generation parameter 601 may be a username, a user ID, or the like used by the UE 410 in the AF 420 or the AF 430. In this case, $K_{AF2}$, $K_{AF3}$, . . . , and $K_{AFn}$ represent root keys of different identities in a same AF.

Figure 7A:
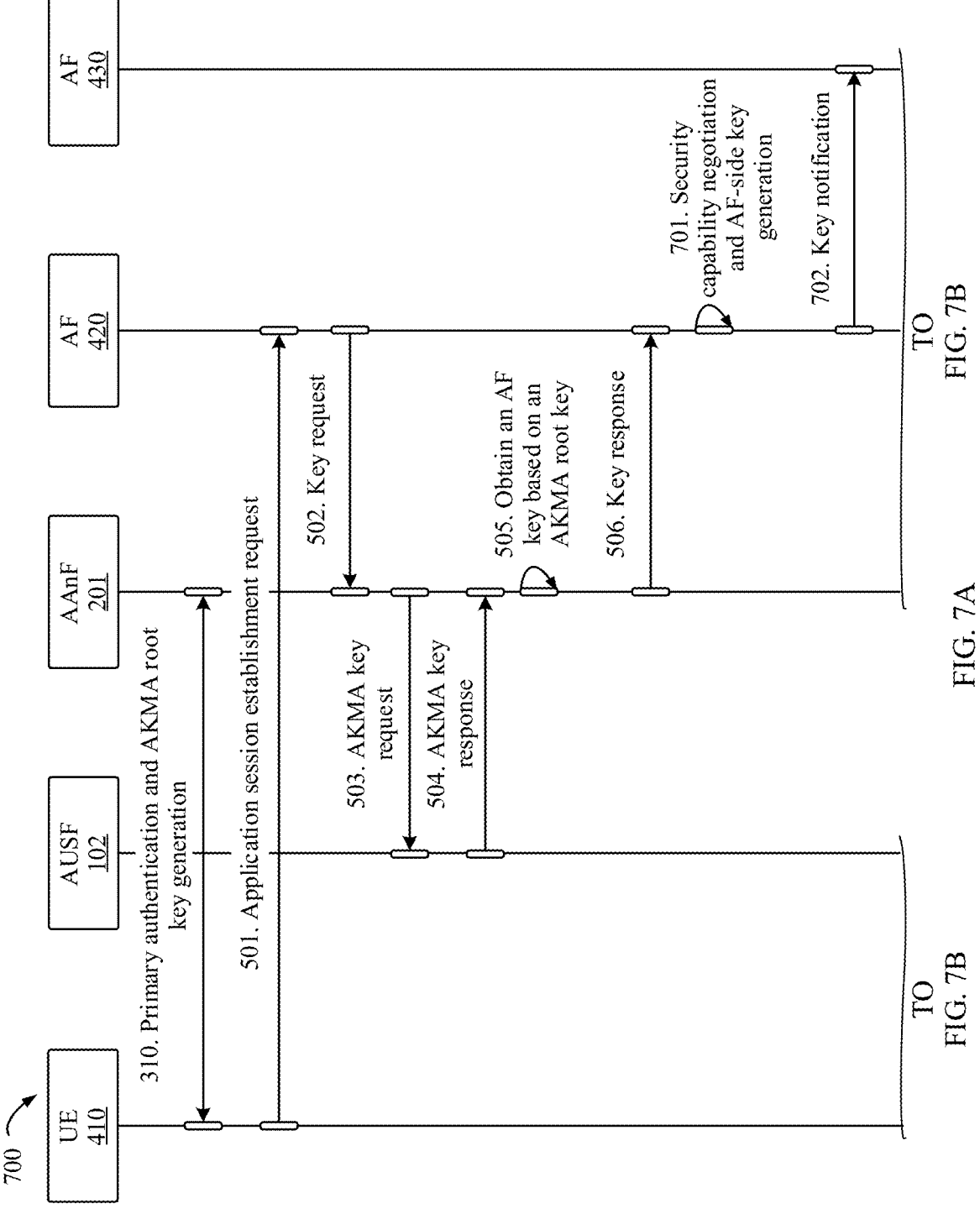
FIG. 7A and FIG. 7B are a signaling exchange diagram of another example communication protection process according to an embodiment of this disclosure.
Figure 7B:
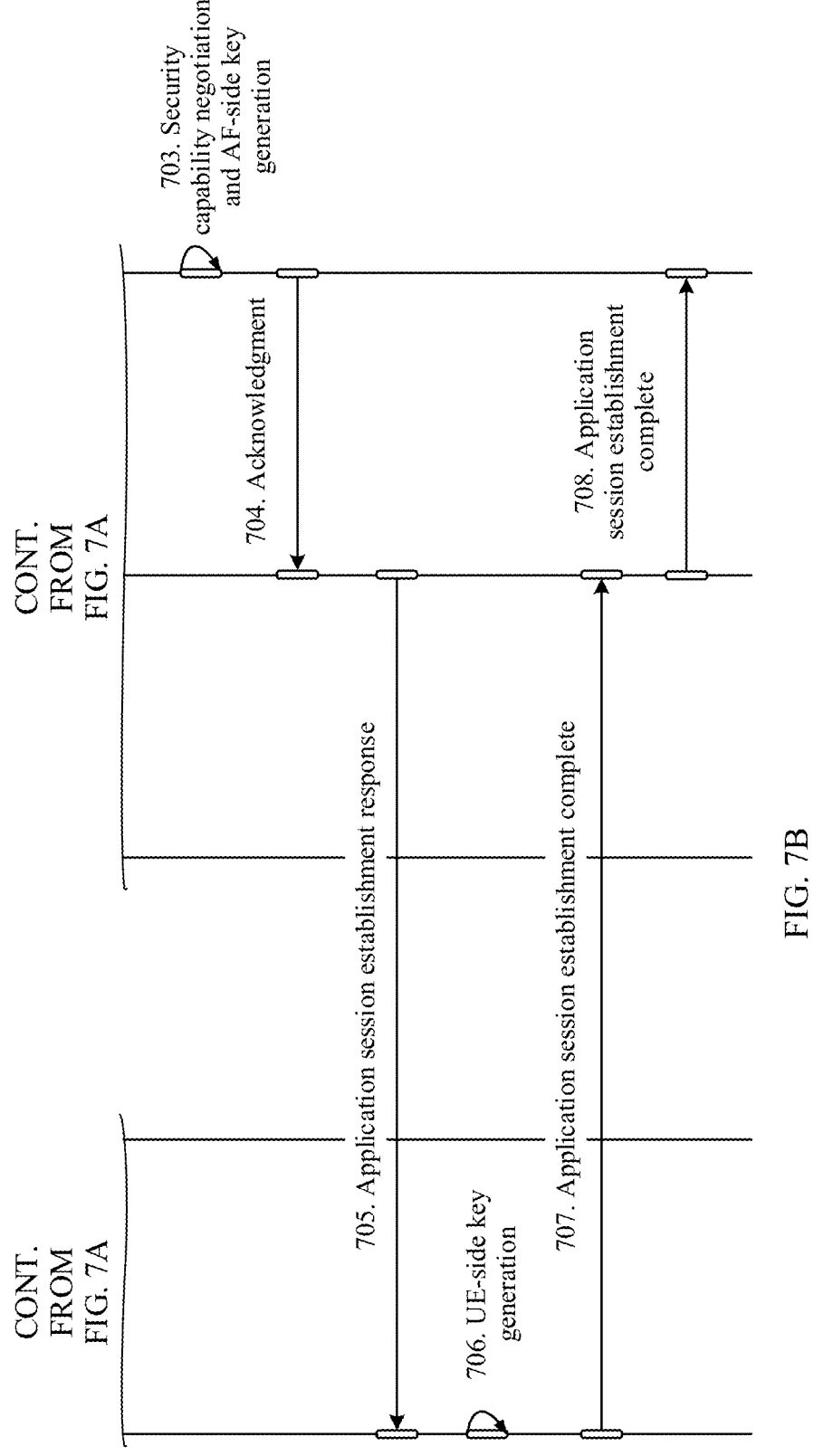

FIG. 7A and FIG. 7B are a signaling exchange diagram of another example communication protection process 700 according to an embodiment of this disclosure. In the example shown in FIG. 7A and FIG. 7B, an AF 420 sends security capability information of UE 410 to an AF 430, so that the AF 430 implements algorithm selection and key generation by itself.

A signaling exchange process shown in steps 310 and 501 to 506 in FIG. 7A and FIG. 7B is the same as the signaling exchange processes shown in steps 310 and 501 to 506 in FIG. 5. Details are not described herein again.

As shown in FIG. 7A and FIG. 7B, the AF 420 may separately implement security negotiation (701) between the AF 420 and the UE 410, to obtain a first security negotiation result. The first security negotiation result may include one or more of the following: a security activation indication for security protection on communication between the UE 410 and the AF 420, a security algorithm to be used by the UE 410 and the AF 420, a key identifier of a security key to be used by the UE 410 and the AF 420, and the key generation parameter.

In some embodiments, the AF 420 may determine whether to activate the security protection on the communication between the UE 410 and the AF 420, and generate the security activation indication based on a determining result. The AF 420 may determine, based on a security policy supported by the UE 410 and a security policy supported by the AF 420, whether to activate the security protection, such as confidentiality protection and/or integrity protection, between the UE 410 and the AF 420, and generate the security activation indication based on the determining result. For example, if the UE 410 supports confidentiality protection and the AF 420 also supports confidentiality protection, the AF 420 may determine that the confidentiality protection on the communication between the UE 410 and the AF 420 needs to be activated. If either does not support confidentiality protection, the AF 420 may determine that the confidentiality protection on the communication between the UE 410 and the AF 420 does not need to be activated. For another example, if the UE 410 supports integrity protection and the AF 420 also supports integrity protection, the AF 420 may determine that the integrity protection on the communication between the UE 410 and the AF 420 needs to be activated. If either one does not support integrity protection, the AF 420 may determine that the integrity protection on the communication between the UE 410 and the AF 420 does not need to be activated. Optionally, the AF 420 may determine, depending on whether a confidentiality protection algorithm supported by the UE 410 includes a confidentiality protection algorithm supported by the AF 420, whether to activate the confidentiality protection on the communication between the UE 410 and the AF 420, and/or determine, depending on whether an integrity algorithm supported by the UE 410 includes an integrity algorithm supported by the AF 420, whether to activate the integrity protection on the communication between the UE 410 and the AF 420. The AF 420 may generate the security activation indication based on the foregoing determining result, where the security activation indication indicates whether to activate the confidentiality protection and/or the integrity protection on the communication between the UE 410 and the AF 420.

In some embodiments, the security activation indication generated by the AF 420 includes a confidentiality protection indication and/or an integrity protection indication. A representation form of the security activation indication may be an explicit indication. For example, '11' indicates that both confidentiality protection and integrity protection are activated; '10' indicates that confidentiality protection is activated but integrity protection is not activated; '00' indicates that neither confidentiality protection nor integrity protection is activated; and '01' indicates that confidentiality protection is not activated but integrity protection is activated. Optionally, the security activation indication may be implicitly represented by a selected security algorithm. When a selected confidentiality protection algorithm is null, it indicates that confidentiality protection is not activated; when the selected confidentiality protection algorithm is non-null, it indicates that confidentiality protection is activated; when the selected integrity protection algorithm is null, it indicates that integrity protection is not activated; and when the selected integrity protection algorithm is non-null, it indicates that integrity protection is activated. For example, information about the selected security algorithm returned by the AF 420 to the UE 410 through an application session establishment response message may be "NIA=integrity protection algorithm 1, NEA=confidentiality protection algorithm 2", where the information indicates that an integrity protection algorithm 1 is used to activate the integrity protection and a confidentiality protection algorithm 2 is used to activate the confidentiality protection. For another example, information about the selected security algorithm returned by the AF 420 to the UE 410 through an application session establishment response message may be "NIA=null, NEA=confidentiality protection algorithm 3", where the information indicates that the integrity protection is not activated and a confidentiality protection algorithm 3 is used to activate the confidentiality protection. For another example, information about the selected security algorithm returned by the AF 420 to the UE 410 through an application session establishment response message may be "NIA=integrity protection algorithm 4, NEA=confidentiality protection algorithm 5", where the information indicates that an integrity protection algorithm 4 is used to activate the integrity protection and a confidentiality protection algorithm 5 is used to activate the confidentiality protection. For another example, the information about the selected security algorithm returned by the AF 420 to the UE 410 through an application session establishment response message may be "NIA=integrity protection algorithm 6, NEA=NULL", where the information indicates that an integrity protection algorithm 6 is used to activate the integrity protection and the confidentiality protection is not activated.

In some embodiments, the AF 420 may select, based on the security algorithm supported by the UE 410 and a security algorithm supported by the AF 420, a security algorithm to be used by the UE 410 and the AF 420, including but not limited to an authentication algorithm, a confidentiality protection algorithm, and/or an integrity algorithm. For example, the AF 420 may determine security algorithms jointly supported by the UE 410 and the AF 420, and prioritize the security algorithms, where a security algorithm with a highest priority is selected. The AF 420 may generate, based on the selected security algorithm, a security key for protecting the communication between the UE 410 and the AF 420, and a key identifier of the security key.

In some embodiments, the AF 420 may generate the security activation indication based on the selected security algorithm, or the security activation indication may be implicitly indicated by the selected security algorithm. For example, if the selected security algorithm includes a confidentiality protection algorithm, the security activation indication indicates to activate confidentiality protection on the communication between the UE 410 and the AF 420. If the selected security algorithm includes an integrity protection algorithm, the security activation indication indicates to activate integrity protection on the communication between the UE 410 and the AF 420.

In some embodiments, the security key may include different levels of security keys generated based on the AF key $K_{AF1}$ of the AF 420, including but not limited to an authentication key, a confidentiality protection key, and/or an integrity protection key. For example, the AF 420 may generate an authentication key based on the key $K_{AF1}$ and an identifier of the selected authentication algorithm, where the authentication key is for implementing authentication between the UE 410 and the AF 420. The AF 420 may generate a confidentiality protection key based on the key $K_{AF1}$ and an identifier of the selected confidentiality protection algorithm, where the confidentiality protection key is for implementing encryption and decryption on communication content between the UE 410 and the AF 420. The AF 420 may generate an integrity protection key based on the key $K_{AF1}$ and an identifier of the selected integrity algorithm, where the integrity protection key is for implementing integrity protection and verification on the communication content between the UE 410 and the AF 420.

In some embodiments, the algorithm selection and the key generation may depend on the security activation indication. That is, corresponding algorithm selection and key generation are performed only when the security activation indication indicates to activate security protection on the communication between the UE 410 and the AF 420. Optionally, the algorithm selection and the key generation may not depend on the security activation indication. In this case, the security activation indication is only for activating use of a corresponding security algorithm and key.

In some embodiments, the AF 420 may generate an AF key $K_{AF2}$ of the AF 430 based on the AF key $K_{AF1}$ of the AF 420 and a key generation parameter. In some embodiments, the key generation parameter used by the AF 420 may be a key generation parameter shared by the UE 410 in an application session establishment request message. Optionally, the key generation parameter used by the AF 420 may be a key generation parameter generated by the AF 420. For example, the key generation parameter generated by the AF 420 or the AF 430 may include at least one of the following: identity information used by the UE 410 in the AF 420 and/or the AF 430, a service type requested by the UE 410, identification information of the AF 430, a freshness parameter, a data network name (DNN), or the like. The freshness parameter may be a random number, a count value, or the like generated by the AF 420.

As shown in FIG. 7A and FIG. 7B, the AF 420 may send (702) a key notification message to the AF 430. In some embodiments, the key notification message may include the security capability information of the UE 410. Additionally or optionally, the key notification message may further include the AF key $K_{AF2}$ of the AF 430, and a key identifier and a validity period of the AF key.

In some embodiments, the AF 420 may determine, based on the identification information of the AF 430 included in the application session establishment request, the AF 430 to be accessed by the UE 410. Optionally, the AF 420 may select the AF 430 based on attribute information of the UE 410. For example, the attribute information may be location information, load information, or the like. The uncrewed aerial vehicle scenario 405 shown in FIG. 4B is used as an example. When the application scenario 405 includes a plurality of TPAEs, keys of all the TPAEs may be the same; or keys of TPAEs in a specific area may be the same but keys of TPAEs in different areas may be different. When an area is used as a granularity, a UTM can determine, based on a current location of a UAV, an area in which the UAV is located and select, based on area information, a TPAE that serves the UAV.

In response to the received key notification message, the AF 430 can implement security negotiation (703) with the UE 410, to obtain a second security negotiation result. The second security negotiation result may include one or more of the following: a security activation indication for security protection on communication between the UE 410 and the AF 430, a security algorithm to be used by the UE 410 and the AF 430, a key identifier of a security key to be used by the UE 410 and the AF 430, and the key generation parameter.

In some embodiments, the AF 430 may determine whether to activate security protection on communication between the UE 410 and the AF 430, and generate a security activation indication based on a determining result. The AF 430 may determine, based on the security policy supported by the UE 410 and a security policy supported by the AF 430, whether to activate the security protection, such as confidentiality protection and/or integrity protection, between the UE 410 and the AF 430, and generate the security activation indication based on the determining result. For example, if the UE 410 supports confidentiality protection and the AF 430 also supports confidentiality protection, the AF 430 may determine that the confidentiality protection on the communication between the UE 410 and the AF 430 needs to be activated. If either the UE 410 or the AF 430 does not support confidentiality protection, the AF 430 may determine that the confidentiality protection on the communication between the UE 410 and the AF 430 does not need to be activated. For another example, if the UE 410 supports integrity protection and the AF 430 also supports integrity protection, the AF 430 may determine that the integrity protection on the communication between the UE 410 and the AF 430 needs to be activated. If either does not support integrity protection, the AF 430 may determine that the integrity protection on the communication between the UE 410 and the AF 430 does not need to be activated. Optionally, the AF 430 may determine, depending on whether the confidentiality protection algorithm supported by the UE 410 includes a confidentiality protection algorithm supported by the AF 430, whether to activate the confidentiality protection on the communication between the UE 410 and the AF 430, and/or determine, depending on whether the integrity algorithm supported by the UE 410 includes an integrity algorithm supported by the AF 430, whether to activate the integrity protection on the communication between the UE 410 and the AF 430. The AF 430 may generate the security activation indication based on the foregoing determining result, where the security activation indication indicates whether to activate the confidentiality protection and/or the integrity protection on the communication between the UE 410 and the AF 430.

In some embodiments, the security activation indication generated by the AF 430 includes a confidentiality protection indication and/or an integrity protection indication. A representation form of the security activation indication may be an explicit indication. For example, '11' indicates that both confidentiality protection and integrity protection are activated; '10' indicates that confidentiality protection is activated but integrity protection is not activated; '00' indicates that neither confidentiality protection nor integrity protection is activated; and '01' indicates that confidentiality protection is not activated but integrity protection is activated. Optionally, the security activation indication may be implicitly represented by a selected security algorithm. When a selected confidentiality protection algorithm is null, it indicates that confidentiality protection is not activated; when the selected confidentiality protection algorithm is non-null, it indicates that confidentiality protection is activated; when the selected integrity protection algorithm is null, it indicates that integrity protection is not activated; and when the selected integrity protection algorithm is non-null, it indicates that integrity protection is activated. For example, information about the selected security algorithm returned by the AF 430 to the UE 410 through an acknowledgment message for the key notification message may be "NIA=integrity protection algorithm 1, NEA=confidentiality protection algorithm 2", where the information indicates that an integrity protection algorithm 1 is used to activate the integrity protection and a confidentiality protection algorithm 2 is used to activate the confidentiality protection. For another example, information about the selected security algorithm returned by the AF 430 to the UE 410 through an acknowledgment message may be "NIA=null, NEA=confidentiality protection algorithm 3", where the information indicates that the integrity protection is not activated and a confidentiality protection algorithm 3 is used to activate the confidentiality protection. For another example, information about the selected security algorithm returned by the AF 430 to the UE 410 through an acknowledgment message may be "NIA=integrity protection algorithm 4, NEA=confidentiality protection algorithm 5", where the information indicates that an integrity protection algorithm 4 is used to activate the integrity protection and a confidentiality protection algorithm 5 is used to activate the confidentiality protection. For another example, information about the selected security algorithm returned by the AF 430 to the UE 410 through an acknowledgment message may be "NIA=integrity protection algorithm 6, NEA=NULL", where the information indicates that an integrity protection algorithm 6 is used to activate the integrity protection and the confidentiality protection is not activated.

In some embodiments, the AF 430 may select, based on the security algorithm supported by the UE 410 and a security algorithm supported by the AF 430, a security algorithm to be used by the UE 410 and the AF 430, including but not limited to an authentication algorithm, a confidentiality protection algorithm, and/or an integrity algorithm. For example, the AF 430 may determine a security algorithms jointly supported by the UE 410 and the AF 430, and prioritize the security algorithms, where a security algorithm with the highest priority is selected. The AF 430 may generate, based on the selected security algorithm and a key generation parameter, a security key for protecting the communication between the UE 410 and the AF 430 and a key identifier of the security key.

In some embodiments, the AF 430 may generate different levels of security keys, including but not limited to an authentication key, a confidentiality protection key, and/or an integrity protection key, based on the AF key $K_{AF2}$ of the AF 430 and the selected security algorithm. For example, the AF 430 may generate an authentication key based on the key $K_{AF2}$ and an identifier of the selected authentication algorithm, where the authentication key is for implementing authentication between the UE 410 and the AF 430. The AF 430 may generate a confidentiality protection key based on the key $K_{AF2}$ and an identifier of the selected confidentiality protection algorithm, where the confidentiality protection key is for implementing encryption and decryption on communication content between the UE 410 and the AF 430. The AF 430 may generate an integrity protection key based on the key $K_{AF2}$ and an identifier of the selected integrity algorithm, where the integrity protection key is for implementing integrity protection and verification on the communication content between the UE 410 and the AF 430.

As shown in FIG. 7A and FIG. 7B, the AF 430 may send (704) the acknowledgment message for the key notification message to the AF 420. The acknowledgment message may include the second security negotiation result.

In some embodiments, the AF 430 may determine, based on the key $K_{AF2}$, an integrity protection key for protecting the acknowledgment message. The integrity protection key may be the key $K_{AF2}$ or a key derived from $K_{AF2}$. The AF 430 may calculate a hash value MAC3 of the acknowledgment message by using the integrity protection key, to protect integrity of the acknowledgment message. The hash value MAC3 may be sent to the AF 420 together with the acknowledgment message.

In response to the received acknowledgment message for the key notification message from the AF 430, the AF 420 may send (705) an application session establishment response message to the UE 410.

In some embodiments, the acknowledgment message, together with its hash value MAC3, may be sent to the UE 410 as at least apart of the application session establishment response message. Additionally or optionally, the application session establishment response message may further include the first security negotiation result between the AF 420 and the UE 410.

In response to the received application session establishment response message from the AF 420, the UE 410 may generate (706) a key on the UE 410 side in the same manner as the AF 420 and the AF 430.

In some embodiments, the UE 410 may generate an AF key $K_{AF1}$ of the AF 420 based on the AKMA root key $K_{AKMA}$ obtained in the primary authentication process. The UE 410 may generate an AF key $K_{AF2}$ of the AF 430 based on the AF key $K_{AF1}$ in the same manner as the AF 420. In response to the received hash value MAC3 from the AF 420, the UE 410 may determine, based on the key $K_{AF2}$ in the same manner as the AF 430, an integrity protection key for verifying the application session establishment response message. The UE 410 may calculate, based on the integrity protection key, a hash value of the acknowledgment message included in the application session establishment response message and compare the hash value with the received hash value MAC3. If the two values are the same, it indicates that the acknowledgment message included in the application session establishment response message has not been tampered with. If the two values are different, it indicates that the acknowledgment message included in the application session establishment response message has been tampered with.

In some embodiments, for example, when the integrity verification succeeds, if the application session establishment response message includes the second security negotiation result, the UE 410 may generate, based on the second security negotiation result in the same manner as the AF 430, a security key for protecting the communication between the UE 410 and the AF 430. If the application session establishment response message includes the first security negotiation result, the UE 410 may generate, based on the first security negotiation result in the same manner as the AF 420, a security key for protecting the communication between the UE 410 and the AF 420.

As shown in FIG. 7A and FIG. 7B, the UE 410 may send (707) an application session establishment complete message to the AF 420. The AF 420 may forward (708) the application session establishment complete message to the AF 430.

In some embodiments, in response to the received application session establishment complete message from the UE 410, if the security activation indication in the first security negotiation result indicates to activate the security protection on the communication between the UE 410 and the AF 420, the UE 410 and the AF 420 may perform end-to-end security protection on the communication between the UE 410 and the AF 420 based on the security algorithm and the corresponding key in the first security negotiation result. For example, if the security activation indication activates the confidentiality protection on the communication between the UE 410 and the AF 420, the UE 410 may use a confidentiality protection algorithm and a confidentiality protection key in the first security negotiation result to encrypt a message/data sent to the AF 420. The AF 420 may decrypt the received message/data based on the confidentiality protection algorithm and the confidentiality protection key in the first security negotiation result. If the security activation indication activates the confidentiality protection on the communication between the UE 410 and the AF 420, the AF 420 may use a confidentiality protection algorithm and a confidentiality protection key in the first security negotiation result to encrypt a message/data sent to the UE 410. The UE 410 may decrypt the received message/data based on the confidentiality protection algorithm and the confidentiality protection key in the first security negotiation result. If the security activation indication activates the integrity protection on the communication between the UE 410 and the AF 420, the UE 410 may use the integrity algorithm and the integrity protection key in the first security negotiation result to perform integrity protection on a message/data sent to the AF 420. The AF 420 may verify integrity of the received message/data based on the integrity algorithm and the integrity protection key in the first security negotiation result. The AF 420 may use the integrity algorithm and the integrity protection key in the first security negotiation result to perform integrity protection on the message/data sent to the UE 410, and the UE 410 may verify integrity of the received message/data based on the integrity algorithm and the integrity protection key in the first security negotiation result.

In some embodiments, the UE 410 may calculate a hash value MAC4 of the application session establishment complete message by using the determined integrity protection key, to protect the integrity of the application session establishment complete message. The hash value MAC4 may be sent to the AF 420 together with the application session establishment complete message. The AF 420 may forward the application session establishment complete message to the AF 430. In response to the received application session establishment complete message and the received hash value MAC4, the AF 430 may calculate a hash value of the application session establishment complete message based on the same integrity protection key, and compare the hash value with the received hash value MAC4. If the two values are the same, it indicates that the application session establishment complete message has not been tampered with. If the two values are different, it indicates that the application session establishment complete message has been tampered with. In this way, the AF 430 can verify integrity of the application session establishment complete message.

In some embodiments, for example, when integrity of the application session establishment complete message is verified, if the security activation indication in the second security negotiation result indicates to activate the security protection on the communication between the UE 410 and the AF 430, the UE 410 and the AF 430 may perform end-to-end security protection on the communication between the UE 410 and the AF 430 based on the security algorithm and the corresponding key in the second security negotiation result. For example, if the security activation indication activates the confidentiality protection on the communication between the UE 410 and the AF 430, the UE 410 may use a confidentiality protection algorithm and a confidentiality protection key in the second security negotiation result to encrypt a message/data sent to the AF 430. The AF 430 may decrypt the received message/data based on the confidentiality protection algorithm and the confidentiality protection key in the second security negotiation result. If the security activation indication activates the confidentiality protection on the communication between the UE 410 and the AF 430, the AF 430 may use a confidentiality protection algorithm and a confidentiality protection key in the second security negotiation result to encrypt a message/data sent to the UE 410. The UE 410 may decrypt the received message/data based on the confidentiality protection algorithm and the confidentiality protection key in the second security negotiation result. If the security activation indication activates the integrity protection on the communication between the UE 410 and the AF 430, the UE 410 may use the integrity algorithm and the integrity protection key in the second security negotiation result to perform integrity protection on a message/data sent to the AF 430. The AF 430 may verify integrity of the received message/data based on the integrity algorithm and the integrity protection key in the second security negotiation result. The AF 430 may use the integrity algorithm and the integrity protection key in the second security negotiation result to perform integrity protection on the message/data sent to the UE 410, and the UE 410 may verify the integrity of the received message/data based on the integrity algorithm and the integrity protection key in the second security negotiation result.

The uncrewed aerial vehicle application scenario shown in FIG. 4B is used as an example. The UAV may perform security protection on a broadcast message by using the negotiated security key and security algorithm. After receiving the broadcast message, and the TPAE performs security deprotection on the broadcast message by using a corresponding key and security algorithm, to obtain a plaintext of the broadcast message. The broadcast message may include some or all of the following parameters: identification information of the UAV, a key identifier, an encrypted ciphertext, a message verification code for integrity protection, and the like.

FIG. 8 is a flowchart of an example communication protection method 800 according to an embodiment of this disclosure. The method 800 may be performed by a terminal device, and the terminal device is, for example, the UE 410 shown in FIG. 4A. It should be understood that the method 800 may further include additional actions that are not shown and/or may omit actions that are shown. The scope of this disclosure is not limited in this respect.

810. The terminal device sends an application session establishment request message to a first AF, where the application session establishment request message includes an AKMA key identifier.

820. The terminal device receives an application session establishment response message from the first AF, where the application session establishment response message includes a security activation indication. The security activation indication indicates whether to activate security protection on communication between the terminal device and a second AF, the security protection includes confidentiality protection and/or integrity protection performed based on a security key, and the security key is generated based on an AKMA key corresponding to the AKMA key identifier.

In some embodiments, the application session establishment request message further includes information about a security algorithm supported by the terminal device, where the security algorithm supported by the terminal device includes a confidentiality protection algorithm supported by the terminal device and/or an integrity protection algorithm supported by the terminal device; and the application session establishment response message further includes information about a security algorithm selected based on the security algorithm supported by the terminal device, where the selected security algorithm includes a selected confidentiality protection algorithm and/or a selected integrity protection algorithm.

830. When the security activation indication indicates to activate the security protection, the terminal device activates, based on the selected security algorithm and the security key, the security protection on the communication with the second AF.

In some embodiments, the first AF and the second AF are a same AF, and the method further includes: the terminal device generates a first AF key based on the AKMA key; and the terminal device generates the security key based on the first AF key and the selected security algorithm, where the security key includes a confidentiality protection key for the confidentiality protection and/or an integrity protection key for the integrity protection.

In some embodiments, the first AF and the second AF are different AFs, and the method further includes: the terminal device generates a first AF key based on the AKMA key; the terminal device generates a second AF key based on the first AF key and a key generation parameter that is shared by the terminal device and the first AF; and the terminal device generates the security key based on the second AF key and the selected security algorithm, where the security key includes a confidentiality protection key for the confidentiality protection and/or an integrity protection key for the integrity protection.

In some embodiments, the application session establishment request message includes the key generation parameter, and the key generation parameter includes at least one of the following: identity information used by the terminal device in the first AF or the second AF; a service type requested by the terminal device from the first AF or the second AF; identification information of the second AF; or a key freshness parameter.

In some embodiments, the application session establishment response message includes the key generation parameter, and the key generation parameter includes a key freshness parameter.

In some embodiments, the application session establishment response message further includes a key identifier, the key identifier is for identifying a security context between the terminal device and the second AF, and the security context includes the security key.

In some embodiments, the application session establishment response message includes a first integrity verification parameter, and the method further includes: The terminal device determines, based on the security key and the first integrity verification parameter, whether the application session establishment response message is tampered with.

In some embodiments, the method further includes: The terminal device sends an application session establishment complete message to the second AF when the application session establishment response message is not tampered with, where the application session establishment complete message includes a second integrity verification parameter calculated based on the security key.

In some embodiments, the first AF and the second AF have a same AF identifier.

FIG. 9 is a flowchart of an example communication protection method 900 according to an embodiment of this disclosure. The method 900 may be performed by a first AF, and the first AF is, for example, the AF 420 shown in FIG. 4A. It should be understood that the method 900 may further include additional actions that are not shown and/or may omit actions that are shown. The scope of this disclosure is not limited in this respect.

910. The first AF receives an application session establishment request message from a terminal device, where the application session establishment request message includes an AKMA key identifier.

920. The first AF sends an application session establishment response message to the terminal device, where the application session establishment response message includes a security activation indication. The security activation indication indicates whether to activate security protection on communication between the terminal device and a second AF, the security protection includes confidentiality protection and/or integrity protection performed based on a security key, and the security key is generated based on an AKMA key corresponding to the AKMA key identifier.

In some embodiments, the application session establishment request message further includes information about a security algorithm supported by the terminal device, where the security algorithm supported by the terminal device includes a confidentiality protection algorithm supported by the terminal device and/or an integrity protection algorithm supported by the terminal device; and the application session establishment response message further includes information about a security algorithm selected based on the security algorithm supported by the terminal device, where the selected security algorithm includes a selected confidentiality protection algorithm and/or a selected integrity protection algorithm.

930. When the security activation indication indicates to activate the security protection, the first AF triggers the second AF to activate, based on the selected security algorithm and the security key, the security protection on the communication with the terminal device.

In some embodiments, the first AF and the second AF are a same AF, and the method further includes: the first AF generates a first AF key based on the AKMA key; and the first AF generates the security key based on the first AF key and the selected security algorithm, where the security key includes a confidentiality protection key for the confidentiality protection and/or an integrity protection key for the integrity protection.

In some embodiments, the first AF and the second AF are different AFs, and the method further includes: the first AF generates a first AF key based on the AKMA key; the first AF generates a second AF key based on the first AF key and a key generation parameter that is shared by the terminal device and the first AF; the first AF generates the security key and a key identifier based on the second AF key and the selected security algorithm, where the security key includes a confidentiality protection key for the confidentiality protection and/or an integrity protection key for the integrity protection, the key identifier is for identifying a security context between the terminal device and the second AF, the security context includes the security key, and the application session establishment response message further includes the key identifier; and the first AF sends a key notification message to the second AF, where the key notification message includes the information about the selected security algorithm, the security key, and the key identifier.

In some embodiments, the security activation indication is indicated by the selected security algorithm, where when the selected confidentiality protection algorithm is null, it indicates that the confidentiality protection on the communication between the terminal device and the second AF is not activated; when the selected confidentiality protection algorithm is non-null, it indicates that the confidentiality protection on the communication between the terminal device and the second AF is activated; when the selected integrity protection algorithm is null, it indicates that the integrity protection on the communication between the terminal device and the second AF is not activated; and when the selected integrity protection algorithm is non-null, it indicates that the integrity protection on the communication between the terminal device and the second AF is activated.

In some embodiments, the method further includes: the first AF determines whether to activate the security protection on the communication between the terminal device and the second AF; and the first AF generates the security activation indication based on a determining result.

In some embodiments, the determining whether to activate the security protection on the communication between the terminal device and the second AF includes: determining, depending on whether the confidentiality protection algorithm supported by the terminal device includes a confidentiality protection algorithm supported by the second AF, whether to activate the confidentiality protection on the communication between the terminal device and the second AF; and/or determining, depending on whether the integrity protection algorithm supported by the terminal device includes an integrity protection algorithm supported by the second AF, whether to activate the integrity protection on the communication between the terminal device and the second AF.

In some embodiments, the application session establishment request message further includes a security policy supported by the terminal device, and the security policy supported by the terminal device indicates whether the terminal device supports activation of the security protection on the communication with the second AF; and the determining whether to activate the security protection on the communication between the terminal device and the second AF includes: determining, by the first AF according to the security policy supported by the terminal device and a security policy supported by the second AF, whether to activate the security protection, where the security policy supported by the second AF indicates whether the second AF supports activation of the security protection on the communication with the terminal device.

In some embodiments, the first AF and the second AF are different AFs, and the method further includes: the first AF generates a first AF key based on the AKMA key; the first AF generates a second AF key based on the first AF key and a key generation parameter that is shared by the terminal device and the first AF; the first AF sends a key notification message to the second AF, where the key notification message includes the information about the security algorithm supported by the terminal device and the second AF key; and the first AF receives an acknowledgment message from the second AF, where the acknowledgment message includes the information about the selected security algorithm, the security activation indication, and a key identifier, the key identifier is for identifying a security context between the terminal device and the second AF, and the security context includes the security key, where the application session establishment response message further includes the key identifier.

In some embodiments, the method further includes: the first AF receives an application session establishment complete message from the terminal device, where the application session establishment complete message includes a second integrity verification parameter; and the first AF determines, based on the security key and the second integrity verification parameter, whether the application session establishment complete message is tampered with.

In some embodiments, the method further includes: The first AF sends an activation message to the second AF when determining that the application session establishment complete message is not tampered with, where the activation message indicates to the second AF to activate, based on the security key, the security protection on the communication with the terminal device.

FIG. 10 is a flowchart of an example communication protection method 1000 according to an embodiment of this disclosure. The method 1000 may be performed by a second AF and the second AF is, for example, the AF 430 shown in FIG. 4A. It should be understood that the method 1000 may further include additional actions that are not shown and/or may omit actions that are shown. The scope of this disclosure is not limited in this respect.

1010. The second AF receives a key notification message from a first AF, where the key notification message includes information about a security algorithm supported by a terminal device and a second AF key.

1020. The second AF sends an acknowledgment message to the first AF, where the acknowledgment message includes information about a security algorithm selected based on the security algorithm supported by the terminal device, a security activation indication, and a key identifier. The selected security algorithm includes a selected confidentiality protection algorithm and/or a selected integrity protection algorithm, the security activation indication indicates whether to activate security protection on communication between the terminal device and the second AF, the security protection includes confidentiality protection and/or integrity protection performed based on a security key, the security key is generated based on the second AF key and the selected security algorithm, the key identifier is for identifying a security context between the terminal device and the second AF, and the security context includes the security key.

1030. When the security activation indication indicates to activate the security protection, the second AF activates, based on the selected security algorithm and the security key, the security protection on the communication with the terminal device.

In some embodiments, the method further includes: the second AF determines whether to activate the security protection on the communication between the terminal device and the second AF; and generates the security activation indication based on a determining result.

In some embodiments, the determining whether to activate the security protection on the communication between the terminal device and the second AF includes: the second AF determines, depending on whether the confidentiality protection algorithm supported by the terminal device includes a confidentiality protection algorithm supported by the second AF, whether to activate the confidentiality protection on the communication between the terminal device and the second AF; and/or determines, depending on whether the integrity protection algorithm supported by the terminal device includes an integrity protection algorithm supported by the second AF, whether to activate the integrity protection on the communication between the terminal device and the second AF.

In some embodiments, the key notification message further includes a security policy supported by the terminal device, and the security policy supported by the terminal device indicates whether the terminal device supports activation of the security protection on the communication with the second AF. The determining whether to activate the security protection on the communication between the terminal device and the second AF includes: the second AF determines, according to the security policy supported by the terminal device and a security policy supported by the second AF, whether to activate the security protection, where the security policy supported by the second AF indicates whether the second AF supports activation of the security protection on the communication with the terminal device.

In some embodiments, the method further includes: the second AF generates the security key and the key identifier based on the second AF key and the selected security algorithm, where the security key includes a confidentiality protection key for the confidentiality protection and/or an integrity protection key for the integrity protection.

In some embodiments, the method further includes: the second AF receives an application session establishment complete message from the first AF, where the application session establishment complete message includes a second integrity verification parameter; and the second AF determines, based on the security key and the second integrity verification parameter, whether the application session establishment complete message is tampered with.

In some embodiments, the method further includes: when the security activation indication indicates to activate the security protection and when determining that the application session establishment complete message is not tampered with, the second AF activates, based on the selected security algorithm and the security key, the security protection on the communication with the terminal device.

FIG. 11 is a block diagram of an example communication apparatus 1100 according to an embodiment of this disclosure. The apparatus 1100 may be implemented as a device or a chip in the device. The scope of this disclosure is not limited in this aspect. The apparatus 1100 may be implemented as the UE 410 shown in FIG. 4A or a part of the UE 410.

As shown in FIG. 11, the apparatus 1100 includes a transceiver module 1110. In some embodiments of the present disclosure, a "module" may be implemented on one or more processors or processing circuits that are optionally coupled with one or more input/output devices or transmitters/receivers. The transceiver module 1110 is configured to: send an application session establishment request message to a first AF, where the application session establishment request message includes an AKMA key identifier. The transceiver module 1110 is further configured to receive an application session establishment response message from the first AF, where the application session establishment response message includes a security activation indication. The security activation indication indicates whether to activate security protection on communication between the apparatus 1100 and a second AF, the security protection includes confidentiality protection and/or integrity protection performed based on a security key, and the security key is generated based on an AKMA key corresponding to the AKMA key identifier. In some embodiments, the application session establishment request message further includes information about a security algorithm supported by the apparatus 1100, where the security algorithm supported by the apparatus 1100 includes a confidentiality protection algorithm supported by the apparatus 1100 and/or an integrity protection algorithm supported by the apparatus 1100; and the application session establishment response message further includes information about a security algorithm selected based on the security algorithm supported by the apparatus 1100, where the selected security algorithm includes a selected confidentiality protection algorithm and/ or a selected integrity protection algorithm. In some embodiments, the apparatus 1100 further includes a security protection module 1120, configured to: when the security activation indication indicates to activate the security protection, activate, based on the selected security algorithm and the security key, the security protection on the communication with the second AF.

It should be understood that the apparatus 1100 may correspond to the method performed by the terminal device or the UE 410 in the foregoing embodiments. Operations and features of the modules in the apparatus 1100 are separately used to implement corresponding steps of the method performed by the terminal device or the UE 410 in the foregoing embodiments, and have same beneficial effects. For the purpose of simplification, specific details are not described again.

FIG. 12 is a block diagram of an example communication apparatus 1200 according to an embodiment of this disclosure. The apparatus 1200 may be implemented as a device or a chip in the device. The scope of this disclosure is not limited in this aspect. The apparatus 1200 may be implemented as the AF 420 shown in FIG. 4A or a part of the AF 420.

As shown in FIG. 12, the apparatus 1200 includes at least a transceiver module 1210. The transceiver module 1210 is configured to: receive an application session establishment request message from a terminal device, where the application session establishment request message includes an AKMA key identifier. The transceiver module 1210 is further configured to send an application session establishment response message to the terminal device, where the application session establishment response message includes a security activation indication. The security activation indication indicates whether to activate security protection on communication between the terminal device and a second AF, the security protection includes confidentiality protection and/or integrity protection performed based on a security key, and the security key is generated based on an AKMA key corresponding to the AKMA key identifier. In some embodiments, the application session establishment request message further includes information about a security algorithm supported by the terminal device, where the security algorithm supported by the terminal device includes a confidentiality protection algorithm and/or an integrity protection algorithm supported by the terminal device; and the application session establishment response message further includes information about a security algorithm selected based on the security algorithm supported by the terminal device, where the selected security algorithm includes a selected confidentiality protection algorithm and/or a selected integrity protection algorithm. In some embodiments, the apparatus 1200 further includes a security protection module 1220. The security protection module 1220 is configured to: when the security activation indication indicates to activate the security protection, trigger the second AF to activate, based on the selected security algorithm and the security key, the security protection on the communication with the terminal device.

It should be understood that the apparatus 1200 may correspond to the method performed by the first AF or the AF 420 in the foregoing embodiments. Operations and features of the modules in the apparatus 1200 are separately used to implement corresponding steps of the method performed by the first AF or the AF 420 in the foregoing embodiments, and have same beneficial effects. For the purpose of simplification, specific details are not described again.

Figure 13:
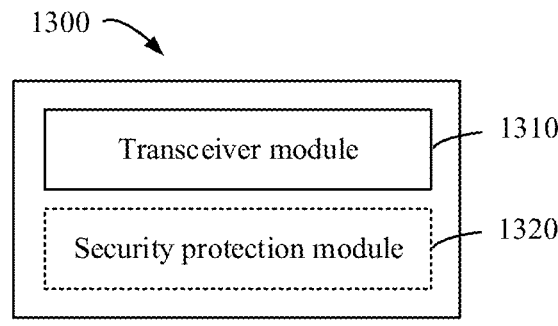
FIG. 13 is a block diagram of an example communication apparatus according to an embodiment of this disclosure.

FIG. 13 is a block diagram of an example communication apparatus 1300 according to an embodiment of this disclosure. The apparatus 1300 may be implemented as a device or a chip in the device. The scope of this disclosure is not limited in this aspect. The apparatus 1300 may be implemented as the AF 430 shown in FIG. 4A or a part of the AF 430.

As shown in FIG. 13, the apparatus 1300 includes at least a transceiver module 1310. The transceiver module 1310 is configured to receive a key notification message from a first AF, where the key notification message includes information about a security algorithm supported by a terminal device and a second AF key. The transceiver module 1310 is further configured to send an acknowledgment message to the first AF, where the acknowledgment message includes information about a security algorithm selected based on the security algorithm supported by the terminal device, a security activation indication, and a key identifier. The selected security algorithm includes a selected confidentiality protection algorithm and/or a selected integrity protection algorithm, the security activation indication indicates whether to activate security protection on communication between the terminal device and the apparatus 1300, the security protection includes confidentiality protection and/or integrity protection performed based on a security key, the security key is generated based on the second AF key and the selected security algorithm, the key identifier is for identifying a security context between the terminal device and the apparatus 1300, and the security context includes the security key. In some embodiments, the apparatus 1300 further includes a security protection module 1320. The security protection module 1320 is configured to: when the security activation indication indicates to activate the security protection, activate, based on the selected security algorithm and the security key, the security protection on the communication with the terminal device.

It should be understood that the apparatus 1300 may correspond to the method performed by the second AF or the AF 430 in the foregoing embodiments. Operations and features of the modules in the apparatus 1300 are separately used to implement corresponding steps of the method performed by the second AF or the AF 430 in the foregoing embodiments, and have same beneficial effects. For the purpose of simplification, specific details are not described again.

Figure 14:
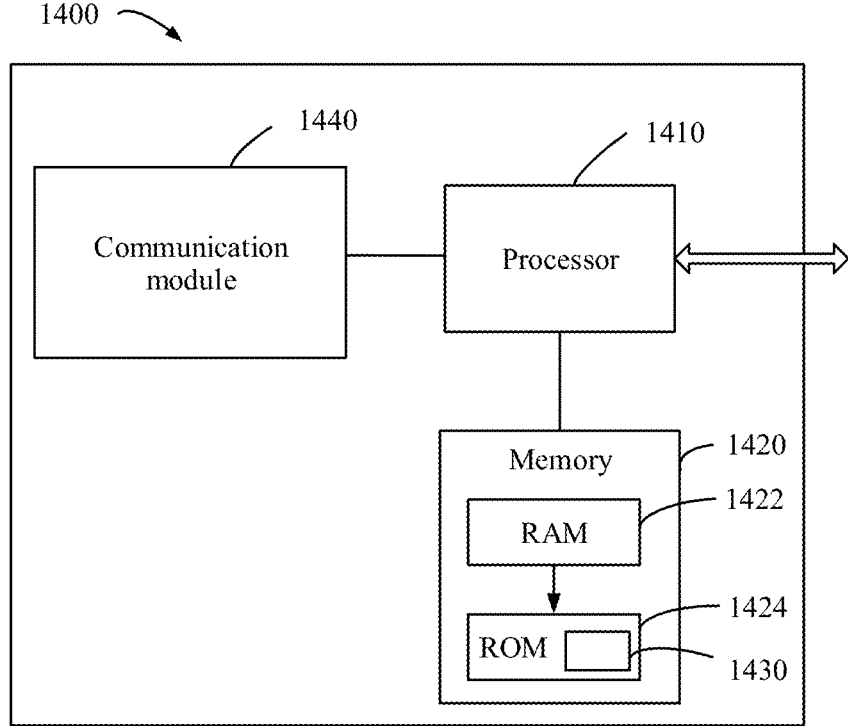
FIG. 14 is a simplified block diagram of an example device applicable for implementing an embodiment of this disclosure.

FIG. 14 is a simplified block diagram of an example device 1400 applicable for implementing an embodiment of this disclosure. The device 1400 may be configured to implement the UE 410, the first AF 420, and/or the second AF 430 shown in FIG. 4A. As shown in the figure, the device 1400 includes one or more processors 1410, one or more memories 1420 coupled to the processors 1410, and a communication module 1440 coupled to the processors 1410.

The communication module 1440 may be configured to perform bidirectional communication. The communication module 1440 may have at least one communication interface for communication. The communication interface may include any interface necessary for communicating with another device.

The processor 1410 may be of any type suitable for a local technology network, and may include but is not limited to one or more of a general-purpose computer, a dedicated computer, a microcontroller, a digital signal processor (DSP), and a controller-based multi-core controller architecture. The device 1400 may have a plurality of processors, such as application-specific integrated circuit chips, which in time belong to a clock synchronized with a main processor.

The memory 1420 may include one or more nonvolatile memories and one or more volatile memories. Examples of the nonvolatile memory include but are not limited to a read-only memory (ROM) 1424, an erasable programmable read-only memory (EPROM), a flash memory, a hard disk, an optical disc (CD), a digital video disc (DVD), and another magnetic storage and/or optical storage. Examples of the volatile memory include but are not limited to random access memory (RAM) 1422 and another volatile memory that does not last for power-off duration.

A computer program 1430 includes computer executable instructions executed by an associated processor 1410. The program 1430 may be stored in the ROM 1420. The processor 1410 may perform any suitable actions and processing by loading the program 1430 into the RAM 1420.

Embodiments of this disclosure may be implemented with the help of the program 1430, so that the device 1400 may perform any process discussed with reference to FIG. 5, FIG. 7A and FIG. 7B, and FIG. 8 to FIG. 10. Embodiments of this disclosure may be alternatively implemented by using hardware or a combination of software and hardware.

Figure 15:
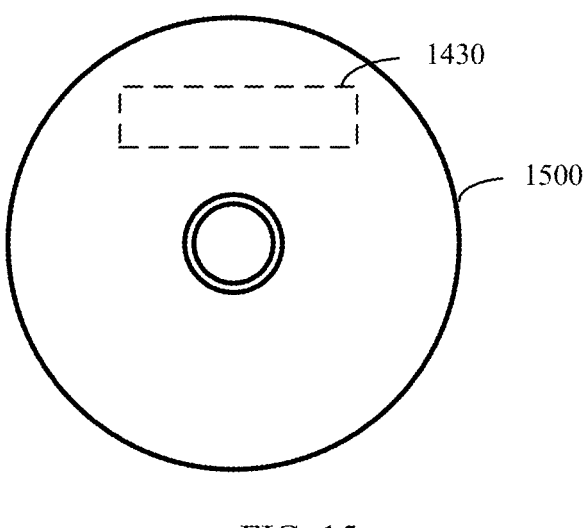
FIG. 15 is a schematic diagram of a computer-readable medium applicable for implementing an embodiment of this disclosure.

In some embodiments, the program 1430 may be tangibly included in a computer-readable medium, and the computer-readable medium may be included in the device 1400 (for example, in the memory 1420) or another storage device that may be accessed by the device 1400. The program 1430 may be loaded from the computer-readable medium into the RAM 1422 for execution. The computer-readable medium may include any type of tangible nonvolatile memory, such as a ROM, an EPROM, a flash memory, a hard disk, a CD, a DVD, or the like. FIG. 15 shows an example of a computer-readable medium 1500 in CD or DVD form. The computer-readable medium stores the program 1430.

Generally, various embodiments of this disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of this disclosure are shown and illustrated as block diagrams, flowcharts, or other diagrams, it should be understood that the blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

This disclosure further provides at least one computer program product tangibly stored on a non-transitory computer-readable storage medium. The computer program product includes computer executable instructions, such as instructions included in a program module, executed in a device on a real or virtual target processor to perform the method 900, the method 1000, and/or the method 1100 as described above with reference to FIG. 9 to FIG. 11. Generally, the program module includes a routine, a program, a library, an object, a class, a component, a data structure, and the like that execute a particular task or implement a particular abstract data type. In various embodiments, functions of program modules may be combined or a function of a program module may be split as needed. The computer-executable instructions for the program module may be executed locally or within a distributed device. In the distributed device, the program modules may be located in local and remote storage media.

Computer program code used to implement the methods disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of this disclosure, the computer program code or related data may be carried by any appropriate carrier, so that a device, an apparatus, or a processor can perform various processing and operations described above. Examples of the carrier include a signal, a computer-readable medium, and the like. Examples of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection portion with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in this disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Addition or optionally, some steps may be omitted, a plurality of steps may be combined into one step for execution, and/or one step may be decomposed into a plurality of steps for execution. It should further be noted that features and functions of two or more apparatuses according to this disclosure may be specified in one apparatus. On the contrary, features and functions of one apparatus described above may be further divided into a plurality of apparatuses for specification.

Although this disclosure has been described with reference to several specific embodiments, it should be understood that this disclosure is not limited to the disclosed specific embodiments. This disclosure is intended to cover the various modifications and equivalent arrangements included within the scope of the appended claims.

What is claimed is:

1. A communication protection method performed by a terminal device or a chip in the terminal device, comprising:
   sending an application session establishment request message to a first application function network element, wherein the application session establishment request message comprises an authentication and key management for application (AKMA) key identifier; and receiving an application session establishment response message from the first application function network element, wherein the application session establishment response message comprises a security activation indication, wherein the security activation indication indicates whether to activate security protection on communication between the terminal device and a second application function network element, the security protection comprises at least one of confidentiality protection or integrity protection performed based on a security key, and wherein the first application function network element and the second application function network element are different application function network elements and the method further comprises:

generating a first application function network element key based on an AKMA key corresponding to the AKMA key identifier;

generating a second application function network element key based on the first application function network element key and a key generation parameter that is shared by the terminal device and the first application function network element; and generating the security key based on the second application function network element key, wherein the security key comprises at least one of a confidentiality protection key for the confidentiality protection or an integrity protection key for the integrity protection.

2. The method according to claim 1, wherein the application session establishment request message further comprises information about a security algorithm supported by the terminal device, wherein the security algorithm supported by the terminal device comprises at least one of a confidentiality protection algorithm supported by the terminal device or an integrity protection algorithm supported by the terminal device; and the application session establishment response message further comprises information about a security algorithm selected based on the security algorithm supported by the terminal device, wherein the selected security algorithm comprises at least one of a selected confidentiality protection algorithm or a selected integrity protection algorithm.

3. The method according to claim 2, wherein the method further comprises:

when the security activation indication indicates to activate the security protection, activating, based on the selected security algorithm and the security key, the security protection on the communication between the terminal and the second application function network element.

4. The method according to claim 2, wherein the generating the security key based on the second application function network element key comprises:

generating the security key based on the second application function network element key and the selected security algorithm.

5. The method according to claim 1, wherein the application session establishment request message comprises the key generation parameter; and the key generation parameter comprises at least one selected from the following:

identity information used by the terminal device in the first application function network element or the second application function network element;

a service type requested by the terminal device from the first application function network element or the second application function network element;

identification information of the second application function network element; or a key freshness parameter.

6. The method according to claim 1, wherein the application session establishment response message comprises the key generation parameter, and the key generation parameter comprises a key freshness parameter.

7. The method according to claim 1, wherein the application session establishment response message further comprises a key identifier, the key identifier is for identifying a security context between the terminal device and the second application function network element, and the security context comprises the security key.

8. The method according to claim 1, wherein the application session establishment response message comprises a first integrity verification parameter, and the method further comprises:

determining, based on the security key and the first integrity verification parameter, whether the application session establishment response message is tampered with.

9. The method according to claim 8, wherein the method further comprises:

sending an application session establishment complete message to the second application function network element when the application session establishment response message is not tampered with, wherein the application session establishment complete message comprises a second integrity verification parameter calculated based on the security key.

10. The method according to claim 1, wherein the first application function network element and the second application function network element have a same application function network element identifier.

11. A communication protection method, comprising:

receiving, by a first application function network element, an application session establishment request message from a terminal device, wherein the application session establishment request message comprises an authentication and key management for application (AKMA) key identifier; and sending, by the first application function network element, an application session establishment response message to the terminal device, wherein the application session establishment response message comprises a security activation indication, wherein the security activation indication indicates whether to activate security protection on communication between the terminal device and a second application function network element, the security protection comprises at least one of confidentiality protection or integrity protection performed based on a security key; wherein the first application function network element and the second application function network element are different application function network elements and the method further comprises:

generating, by the first application function network element, a first application function network element key based on an AKMA key corresponding to the AKMA key identifier;

generating, by the first application function network element, a second application function network element key based on the first application function network element key and a key generation parameter that is shared by the terminal device and the first application function network element;

generating, by the first application function network element, the security key based on the second application function network element key, wherein the security key comprises at least one of a confidentiality protection key for the confidentiality protection or an integrity protection key for the integrity protection; and sending, by the first application function network element, a key notification message to the second application function network element, wherein the key notification message comprises the security key.

12. The method according to claim 11, wherein the application session establishment request message further comprises information about a security algorithm supported by the terminal device, wherein the security algorithm supported by the terminal device comprises at least one of a confidentiality protection algorithm supported by the terminal device or an integrity protection algorithm supported by the terminal device; and the application session establishment response message further comprises information about a security algorithm selected based on the security algorithm supported by the terminal device, wherein the selected security algorithm comprises at least one of a selected confidentiality protection algorithm or a selected integrity protection algorithm.

13. The method according to claim 12, wherein the method further comprises:

when the security activation indication indicates to activate the security protection, triggering, by the first application function network element, the second application function network element to activate, based on the selected security algorithm and the security key, the security protection on the communication between the second application function network element and the terminal device.

14. The method according to claim 11, wherein the generating, by the first application function network element, the security key based on the second application function network element key, comprises:

generating, by the first application function network element, the security key and a key identifier based on the second application function network element key and the selected security algorithm, wherein the key identifier is for identifying a security context between the terminal device and the second application function network element, the security context comprises the security key, and the application session establishment response message further comprises the key identifier.

15. The method according to claim 12, wherein the security activation indication is indicated by the selected security algorithm, wherein when the selected confidentiality protection algorithm is null, it indicates that the confidentiality protection on the communication between the terminal device and the second application function network element is not activated;

when the selected confidentiality protection algorithm is non-null, it indicates that the confidentiality protection on the communication between the terminal device and the second application function network element is activated;

when the selected integrity protection algorithm is null, it indicates that the integrity protection on the communication between the terminal device and the second application function network element is not activated; and when the selected integrity protection algorithm is non-null, it indicates that the integrity protection on the communication between the terminal device and the second application function network element is activated.

16. The method according to claim 12, wherein the method further comprises:

determining, by the first application function network element, whether to activate the security protection on the communication between the terminal device and the second application function network element; and generating, by the first application function network element, the security activation indication based on a determining result.

17. The method according to claim 16, wherein the determining whether to activate the security protection on the communication between the terminal device and the second application function network element comprises at least one of:

determining, depending on whether the confidentiality protection algorithm supported by the terminal device comprises a confidentiality protection algorithm supported by the second application function network element, whether to activate the confidentiality protection on the communication between the terminal device and the second application function network element; or determining, depending on whether the integrity protection algorithm supported by the terminal device comprises an integrity protection algorithm supported by the second application function network element, whether to activate the integrity protection on the communication between the terminal device and the second application function network element.

18. The method according to claim 11, wherein the method further comprises:

receiving, by the first application function network element, an application session establishment complete message from the terminal device, wherein the application session establishment complete message comprises a second integrity verification parameter; and determining, by the first application function network element based on the security key and the second integrity verification parameter, whether the application session establishment complete message is tampered with.

19. An apparatus comprising a processor configured to execute instructions stored in a memory to cause the apparatus to:

send an application session establishment request message to a first application function network element, wherein the application session establishment request message comprises an authentication and key management for application (AKMA) key identifier; and receive an application session establishment response message from the first application function network element, wherein the application session establishment response message comprises a security activation indication, wherein the security activation indication indicates whether to activate security protection on communication between the apparatus and a second application function network element, the security protection comprises at least one of confidentiality protection or integrity protection performed based on a security key, and wherein the first application function network element and the second application function network element are different application function network elements and the apparatus is further caused to:

generate a first application function network element key based on an AKMA key corresponding to the AKMA key identifier;

generate a second application function network element key based on the first application function network element key and a key generation parameter that is shared by the apparatus and the first application function network element; and generate the security key based on the second application function network element key, wherein the security key comprises at least one of a confidentiality protection key for the confidentiality protection or an integrity protection key for the integrity protection.

20. An apparatus comprising a processor configured to execute instructions stored in a memory to cause the apparatus to:

receive an application session establishment request message from a terminal device, wherein the application session establishment request message comprises an authentication and key management for application (AKMA) key identifier; and send an application session establishment response message to the terminal device, wherein the application session establishment response message comprises a security activation indication, the security activation indication indicates whether to activate security protection on communication between the terminal device and a second application function network element, the security protection comprises at least one of confidentiality protection or integrity protection performed based on a security key; wherein the apparatus and the second application function network element are different and the apparatus is further caused to:

generate a first application function network element key based on an AKMA key corresponding to the AKMA key identifier;

generate a second application function network element key based on the first application function network element key and a key generation parameter that is shared by the terminal device and the apparatus;

generate the security key based on the second application function network element key, wherein the security key comprises at least one of a confidentiality protection key for the confidentiality protection or an integrity protection key for the integrity protection; and send a key notification message to the second application function network element, wherein the key notification message comprises the security key.

* * * * *